(12) United States Patent
Fowe

(10) Patent No.: US 11,348,453 B2
(45) Date of Patent: May 31, 2022

(54) METHOD AND APPARATUS FOR DYNAMIC SPEED AGGREGATION OF PROBE DATA FOR HIGH-OCCUPANCY VEHICLE LANES

(71) Applicant: HERE GLOBAL B.V., Eindhoven (NL)

(72) Inventor: James Fowe, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 119 days.

(21) Appl. No.: 16/230,145

(22) Filed: Dec. 21, 2018

(65) Prior Publication Data

US 2020/0202708 A1     Jun. 25, 2020

(51) Int. Cl.
*G08G 1/01*            (2006.01)
*G08G 1/052*       (2006.01)

(52) U.S. Cl.
CPC ......... *G08G 1/0145* (2013.01); *G08G 1/0112* (2013.01); *G08G 1/0133* (2013.01); *G08G 1/052* (2013.01)

(58) Field of Classification Search
None
See application file for complete search history.

(56) References Cited

U.S. PATENT DOCUMENTS

| | | | | |
|---|---|---|---|---|
| 9,933,272 | B2* | 4/2018 | Woolley | G01C 21/36 |
| 2012/0095682 | A1* | 4/2012 | Wilson | B60W 40/10 |
| | | | | 701/532 |
| 2014/0278052 | A1* | 9/2014 | Slavin | G08G 1/0145 |
| | | | | 701/400 |
| 2015/0170514 | A1* | 6/2015 | Stenneth | G08G 1/0133 |
| | | | | 701/117 |
| 2015/0312327 | A1* | 10/2015 | Fowe | G01C 21/26 |
| | | | | 701/23 |

(Continued)

FOREIGN PATENT DOCUMENTS

| | | |
|---|---|---|
| EP | 3333824 A1 | 6/2018 |
| EP | 3418997 A1 | 12/2018 |

(Continued)

OTHER PUBLICATIONS

Wikipedia, "High-occupancy vehicle lane", retrieved on Dec. 21, 2018 from https://en.wikipedia.org/wiki/High-occupancy_vehicle_lane, pp. 1-8.

(Continued)

*Primary Examiner* — Jelani A Smith
*Assistant Examiner* — Alexander C. Bost
(74) *Attorney, Agent, or Firm* — Ditthavong, Steiner & Mlotkowski

(57) ABSTRACT

An approach is provided for speed aggregation of probe data for high-occupancy-vehicle (HOV) or other road lanes. The approach involves, for example, determining a line that is parallel to a road segment and divides the road segment along a longitudinal axis. The approach also involves determining a spatial distribution of probe data collected from the road segment with respect to the line. The approach further involves clustering the probe data into a first cluster and a second cluster based on speed. The approach further involves assigning the first cluster to a first lane of the road segment, the second cluster to a second lane of the road segment, or a combination thereof based on the spatial distribution to output a bi-modality event (e.g., an HOV traffic event).

16 Claims, 19 Drawing Sheets

(56) References Cited

U.S. PATENT DOCUMENTS

| | | | |
|---|---|---|---|
| 2016/0046290 A1* | 2/2016 | Aharony | B60W 10/04 |
| | | | 701/41 |
| 2017/0032667 A1* | 2/2017 | Fowe | G08G 1/0133 |
| 2017/0084178 A1* | 3/2017 | Jain | G08G 1/096827 |
| 2017/0089717 A1* | 3/2017 | White | G01C 21/3492 |
| 2017/0191834 A1* | 7/2017 | Fowe | G01C 21/10 |
| 2018/0080773 A1 | 3/2018 | Fowe | |
| 2018/0122154 A1* | 5/2018 | Grush | H04W 4/021 |
| 2018/0158332 A1 | 6/2018 | Jang et al. | |
| 2018/0174443 A1 | 6/2018 | Fowe et al. | |
| 2018/0188043 A1* | 7/2018 | Chen | G05D 1/0088 |
| 2018/0202814 A1* | 7/2018 | Kudrynski | G01C 21/367 |
| 2018/0297596 A1* | 10/2018 | Li | B60W 30/12 |
| 2019/0079524 A1* | 3/2019 | Zhu | B62D 15/0255 |
| 2019/0096258 A1* | 3/2019 | Ide | B62D 15/025 |
| 2019/0226853 A1* | 7/2019 | Kubiak | G06T 3/0043 |
| 2019/0310100 A1* | 10/2019 | Yang | G08G 1/0137 |
| 2020/0018612 A1* | 1/2020 | Wolcott | G01C 21/3492 |
| 2020/0247431 A1* | 8/2020 | Ferencz | B60W 60/001 |

FOREIGN PATENT DOCUMENTS

| | | | |
|---|---|---|---|
| WO | 2018075040 A1 | 4/2018 | |
| WO | 2018228279 A1 | 12/2018 | |

OTHER PUBLICATIONS

Office Acton for related European Patent Application No. 19218427.3-1203, dated May 13, 2020, 9 pages.

Office Action for related European Patent Application No. 19 218 427.3-1203, dated Feb. 14, 2022, 5 pages.

* cited by examiner

METHOD AND APPARATUS FOR DYNAMIC SPEED AGGREGATION OF PROBE DATA FOR HIGH-OCCUPANCY VEHICLE LANES

BACKGROUND

This invention is related to the field of traffic processing using probe data (e.g., data indicating a position and/or heading of a probe device traveling in a road network). Generally, a primary goal of traffic data providers is the generation of accurate traffic speed information on every road or travel segment within its geographic database. However, one of the most challenging travel segments for estimating traffic information are travel segments that exhibit different observed clusters of travel speeds such as on roads with high-occupancy vehicle (HOV) lanes where travel speeds on HOV lanes and non-HOV lanes of the same road segment can differ significantly (i.e., exhibit bi-modality with respect to speed). Accordingly, service providers face significant technical challenges to avoiding inaccurate inferences of traffic congestion or other traffic-speed related events when processing probe data collected from road segments that have travel lanes such as HOV lanes and can be multi-modal with respect to travel speed.

SOME EXAMPLE EMBODIMENTS

Therefore, there is a need for an approach for dynamic speed aggregation of probe data for high-occupancy vehicle (HOV) lanes or other road lanes that can potentially exhibit multi-modality with respect to speed.

According to one embodiment, a method comprises determining a line that is parallel to a road segment and divides the road segment along a longitudinal axis. The method also comprises determining a spatial distribution of probe data collected from the road segment with respect to the line. The method further comprises clustering the probe data into a first cluster and a second cluster based on speed. The method further comprises assigning the first cluster to a first lane of the road segment, the second cluster to a second lane of the road segment, or a combination thereof based on the spatial distribution to output a bi-modality event (e.g., an HOV traffic event occurring on the road segment).

According to another embodiment, an apparatus comprises at least one processor, and at least one memory including computer program code for one or more computer programs, the at least one memory and the computer program code configured to, with the at least one processor, cause, at least in part, the apparatus to determine a line that is parallel to a road segment and divides the road segment along a longitudinal axis. The apparatus is also caused to determine a spatial distribution of probe data collected from the road segment with respect to the line. The apparatus is further caused to cluster the probe data into a first cluster and a second cluster based on speed. The apparatus is further caused to assign the first cluster to a first lane of the road segment, the second cluster to a second lane of the road segment, or a combination thereof based on the spatial distribution to output a bi-modality event (e.g., an HOV traffic event occurring on the road segment).

According to another embodiment, a computer-readable storage medium carries one or more sequences of one or more instructions which, when executed by one or more processors, cause, at least in part, an apparatus to determine a line that is parallel to a road segment and divides the road segment along a longitudinal axis. The apparatus is also caused to determine a spatial distribution of probe data collected from the road segment with respect to the line. The apparatus is further caused to cluster the probe data into a first cluster and a second cluster based on speed. The apparatus is further caused to assign the first cluster to a first lane of the road segment, the second cluster to a second lane of the road segment, or a combination thereof based on the spatial distribution to output a bi-modality event (e.g., an HOV traffic event occurring on the road segment).

According to another embodiment, an apparatus comprises means for determining a line that is parallel to a road segment and divides the road segment along a longitudinal axis. The apparatus also comprises means for determining a spatial distribution of probe data collected from the road segment with respect to the line. The apparatus further comprises means for clustering the probe data into a first cluster and a second cluster based on speed. The apparatus further comprises means for assigning the first cluster to a first lane of the road segment, the second cluster to a second lane of the road segment, or a combination thereof based on the spatial distribution to output a bi-modality event (e.g., an HOV traffic event occurring on the road segment).

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing dynamic speed aggregation of probe data for high-occupancy vehicle (HOV) lanes or equivalent road lanes with multi-modal speed profiles are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
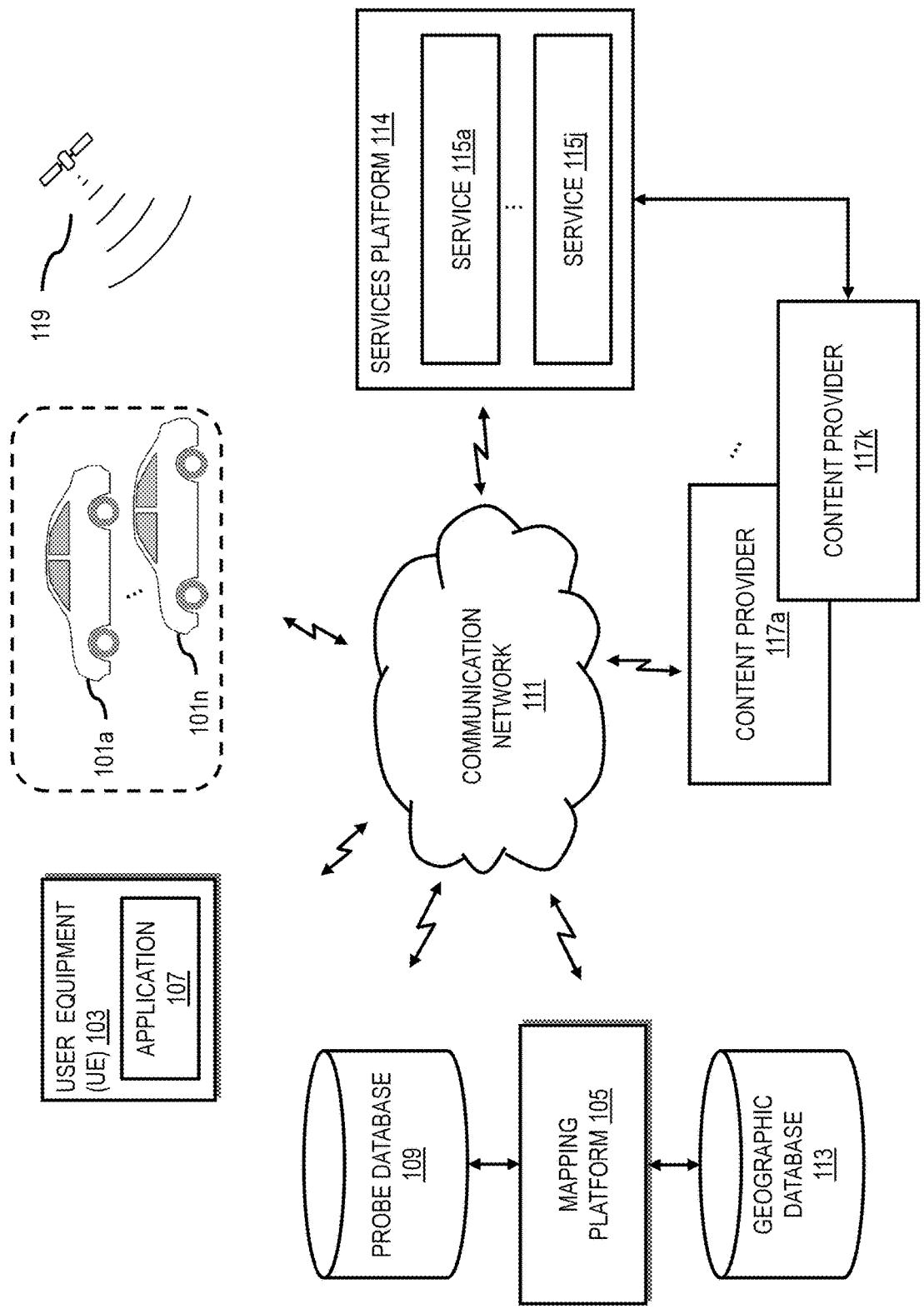
FIG. 1 is a diagram of a system for providing dynamic speed aggregation of probe data for high-occupancy vehicle (HOV) or equivalent road lanes, according to one embodiment.

FIG. 1 is a diagram of a system for providing dynamic speed aggregation of probe data for high-occupancy vehicle (HOV) or equivalent road lanes, according to one embodiment. Generally, HOV lanes (also known as carpool lanes, diamond lanes, etc.) are defined as transit lanes restricted to only vehicles (e.g., vehicles 101a-101n, also collectively referred to as vehicles 101) carrying more than more than one passenger. The exact minimum number of passengers required to drive in an HOV lane can vary with the road or jurisdiction (e.g., 2 or more passengers, 3 or more passengers, etc. may be required on different roads or jurisdictions). This transportation rule, for instance, is designed to encourage ride sharing and less single-occupant vehicles 101 on the road. The aim is to optimize traffic for a city or jurisdiction by reducing the number of cars on the road as a way to design a traffic flow system that can move more people faster using fewer cars or vehicles 101.

Figure 2A:
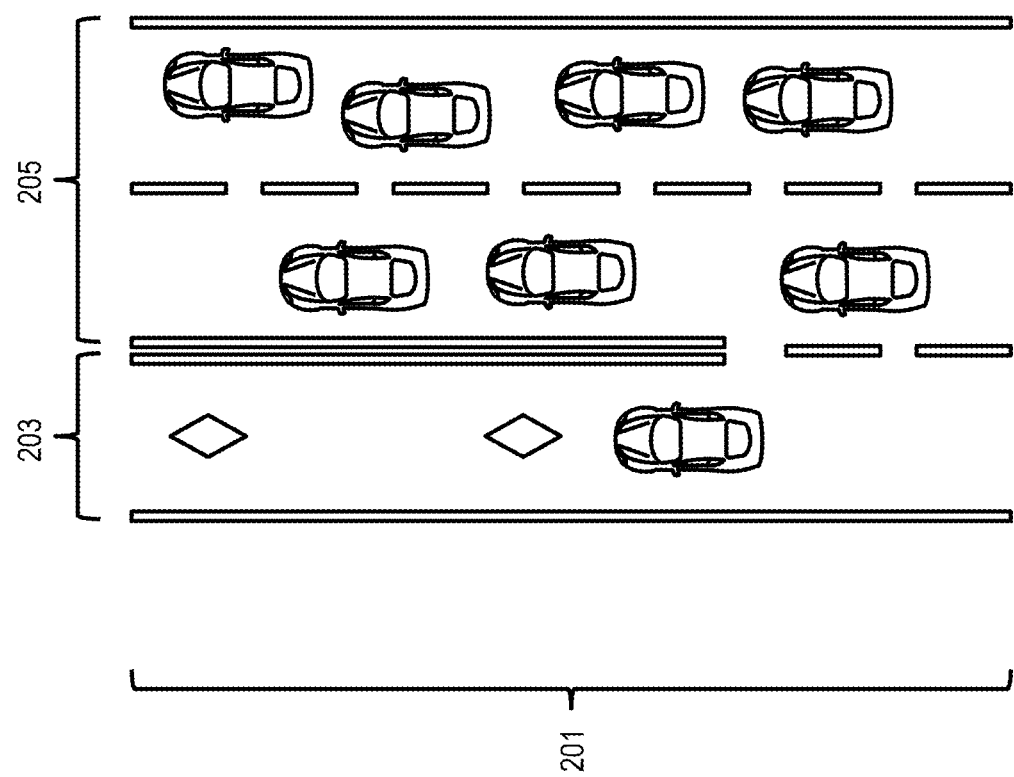
FIG. 2A is a diagram illustrating an example road segment with an HOV lane, according to one embodiment.

FIG. 2A is a diagram of depicting an example of a pedestrian probe trajectory, according to one embodiment. A road segment or highway 201 can include at least one HOV lane 203 and one or more non-HOV lanes 205. Within a particular jurisdiction, the HOV lane 203 is typically located on either the left side or the right side of the road segment 201. For example, in the United States, most HOV lanes 203 are the left most lanes of the road segment 201 as shown. Typically, HOV lanes 203 are delineated by lane lines, medians, barriers, etc. and markings (e.g., diamonds).

While HOV lanes can be prominent on many roads, it can hard to obtain insights on their performance (e.g., average travel speed) using probe data (e.g., GPS probe data collected from one or more sensors of the vehicles 101 or user equipment (UE) 103 such as mobile devices carried by passengers) due to the limitation of location sensing technology (e.g., GPS technology) in which many of the probe points come with errors that do not allow for lane-level precision. Hence, it is technically challenging to disambiguate on which lane the probe data is on, e.g., whether HOV lanes 203 or non-HOV lanes 205 of the road segment 201 to which the probe data is map-matched.

Traditional traffic products average all the probe speeds on road segments or links with HOV lanes, erasing any lane level insight. Another problem is that most roads with HOV lanes have different kinds of rules for different times of the day, some jurisdictions turn on the HOV lanes mode only during rush hour, while some turn on HOV lanes only on week-days. In yet other cases, HOV lanes can be activated randomly or dynamically depending on traffic condition. Some transportation departments leave HOV lanes all open to all cars, however they put a toll on the HOV lanes and charge single-passenger vehicles that take the HOV lane while vehicles with the minimum number of passengers (e.g., two or more passengers) are not charged. All these rules beg the need to have a lane-level detailed real-time traffic publishing system on these roads. For example, by having such data, vehicle navigation systems and routing algorithms can make informed decisions to optimize route and lane choices and/or provide any other type of mapping, navigation, and/or location-based services.

However, because traditional probe data provides no lane-level specific information, there can be ambiguity with respect to determining probe speed values for HOV lanes versus non-HOV lanes. Therefore, the ambiguity in how to process GPS data on road segments with HOV lanes remains a major bottleneck and technical barrier on how to obtain real-time traffic or historical analytics of the performance of the HOV lanes. In other words, the technical challenge is that there is no lane-level precision that allows for accurate map-matching of probe data (e.g., GPS probes), hence it is technically difficult for the system 100 (e.g., a mapping platform 105 of the system 100) to know which probes are on the HOV lanes or not.

Figure 2B:
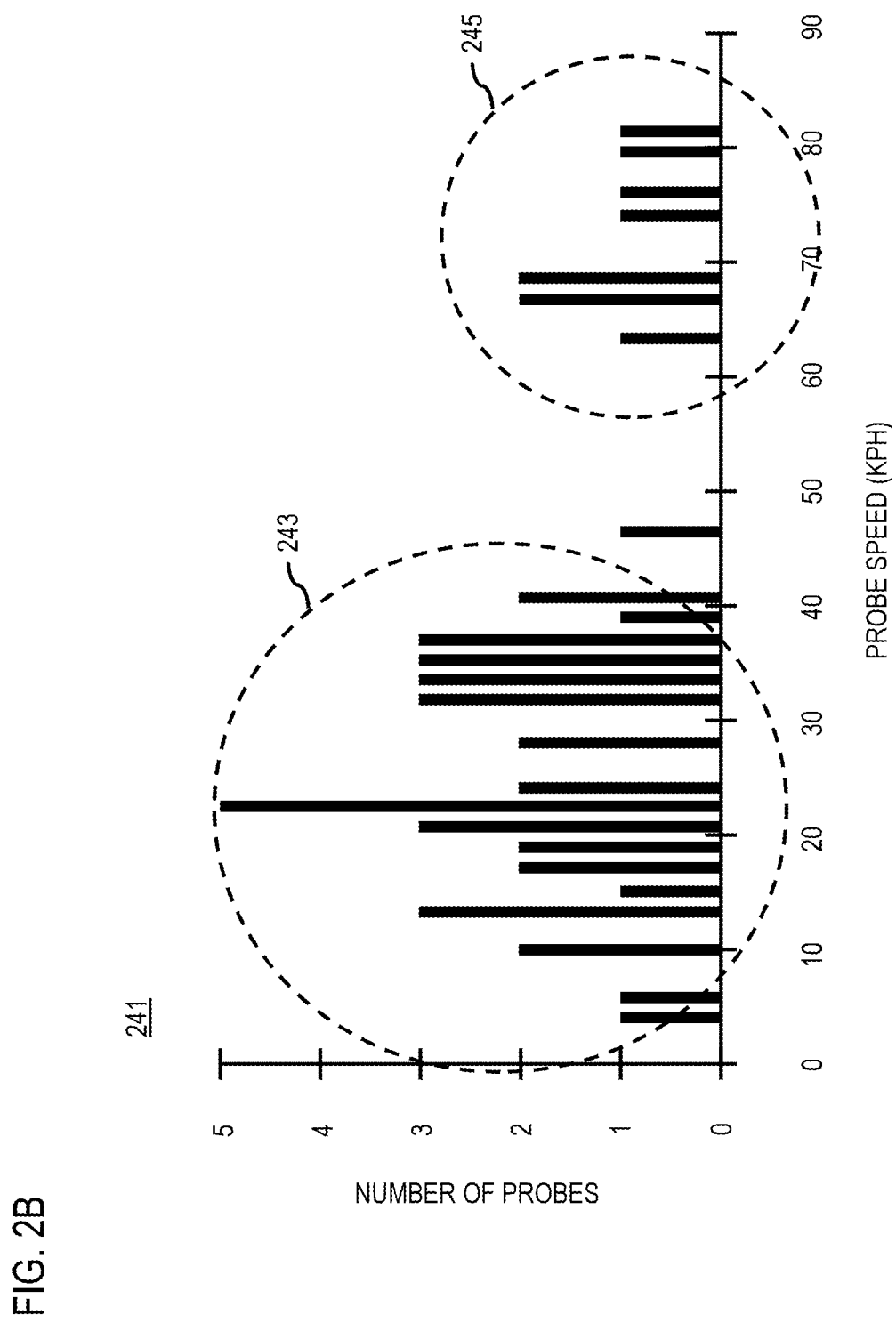
FIG. 2B is a diagram illustrating an example of bi-modal traffic speeds on a road segment with an HOV lane, according to one embodiment.

This leads to having probe speed distributions that are bi-modal as shown in the histogram 241 in FIG. 2B. In the example, of FIG. 2B, probe data is collected from vehicles 101 and/or UEs 103 (e.g., mobile devices executing mapping/navigation applications 107 to collect and report probe data for storage in a probe database 109 over a communication network 111) traveling a monitored road segment that includes HOV and non-HOV lanes. The histogram 241 is bi-modal with respect speed, resulting in a low speed (LS) cluster 243 of probes (e.g., probes with speeds below 50 kph) and a high speed (HS) cluster 245 of probes (e.g., probes with speeds above 50 kph). In this example, the average probe speed of the LS cluster 243 is 28 kph and the average probe speed of the HS cluster 80 kph, thereby indicating speed bi-modality (e.g., a road segment having a simultaneous LS and HS probe clusters or speed profiles). Averaging the speed of all the probes of the road segment would not reflect the true traffic state on non-HOV lanes (e.g., which is probably heavily congested given the LS cluster 243 average speed of 28 kph), neither does it reflect the true state of traffic on HOV lanes (e.g., which is probably free flowing given the HS cluster 245 average speed of 80 kph).

Disambiguating this type of speed distribution is a challenge. For example, even after detecting bi-modality and partitioning the speed distribution into different speed clusters (e.g., higher speed and lower speed clusters) as discussed with respect to the example of FIG. 2B above, being sure of where to place these speed clusters remains a huge technical challenge as the HOV lanes could sometimes have the lower speed. Therefore, always assigning the higher speed cluster to HOV lanes and/or lower speed clusters to non-HOV lanes can lead to inaccurate results that are not representative of real-world conditions. Traditional approaches to confirming such assignments such as manual confirmation by sending observers or processing images of the traffic can require significantly more manual and, computational resources (e.g., addition processing, memory, and/or bandwidth resources to process the confirmatory data).

Other traditional approaches may look at downstream speed profiles in an attempt to disambiguate the probe data. For example, in traditional split lane traffic (SLT) algorithms, because there is a junction split downstream, the system 100 may able to ascertain the direction of HS and LS by looking at the downstream speeds, but in the case of HOV lanes, there typically are no divergent downstream speeds. Thus, disambiguating this type of speed cluster on HOV lanes compared to that of non-HOV lanes is a challenging problem. As discussed above, while the naïve assumption of taking lower speeds to be non-HOV roads and higher(faster) speed as HOV lane speed is possible, it is not a complete solution as there are cases where it is the HOV lanes speeds that are slower.

To address these technical problems and challenges, a system 100 of FIG. introduces a capability to obtain lane-level insight automatically from probe data on road segments with HOV lanes or equivalent road lanes that exhibit bi-modality respect to vehicle speed. In one embodiment, the system 100 is able to solve these technical problems using Vehicle Lane Pattern (VLP) technique that combines knowledge of HOV topology (e.g., data indicating the lane location of HOV lanes on a road segment queried, for instance, from a geographic database 113) with the spatial distribution of probes. In one embodiment, the system 100 determines the spatial distribution by using a lane distance data (the d-value data) computed from the distances of raw probes to center line or other reference line running along a longitudinal axis of the road segment to disambiguate between detected probe speed clusters. In one embodiment, the system 100 also introduces the capability to dynamically aggregate an HOV event on a road by identifying the coverage or road segment/strand where the HOV lanes are moving significantly faster than non-HOV lanes, particularly on road segments where there is also traffic congestion. The disambiguation and/or dynamic aggregation of HOV traffic events can be performed in real-time.

In other words and in one embodiment, to disambiguate bi-modality probe speed clusters on road segments with HOV lanes, the HOV topology is different because it is a straight road and there is no bi-modality downstream, hence even if a bi-modality detection and clustering (BDC) algorithm produces clusters of HS and LS probe speeds, disambiguating which side of the road (left or right) these speeds are is still very challenging. In addition, the system 100 can dynamically detect the length of the road-segment in which these bi-modal speeds are consistent so that the system 100 can show or publish the lane-level details for such a segment, and then drivers and routing algorithms (e.g., used by a services platform 114 and/or any of the services 115*a*-115*j* of the services platform 114) can take informed decisions with this information.

Figure 3:
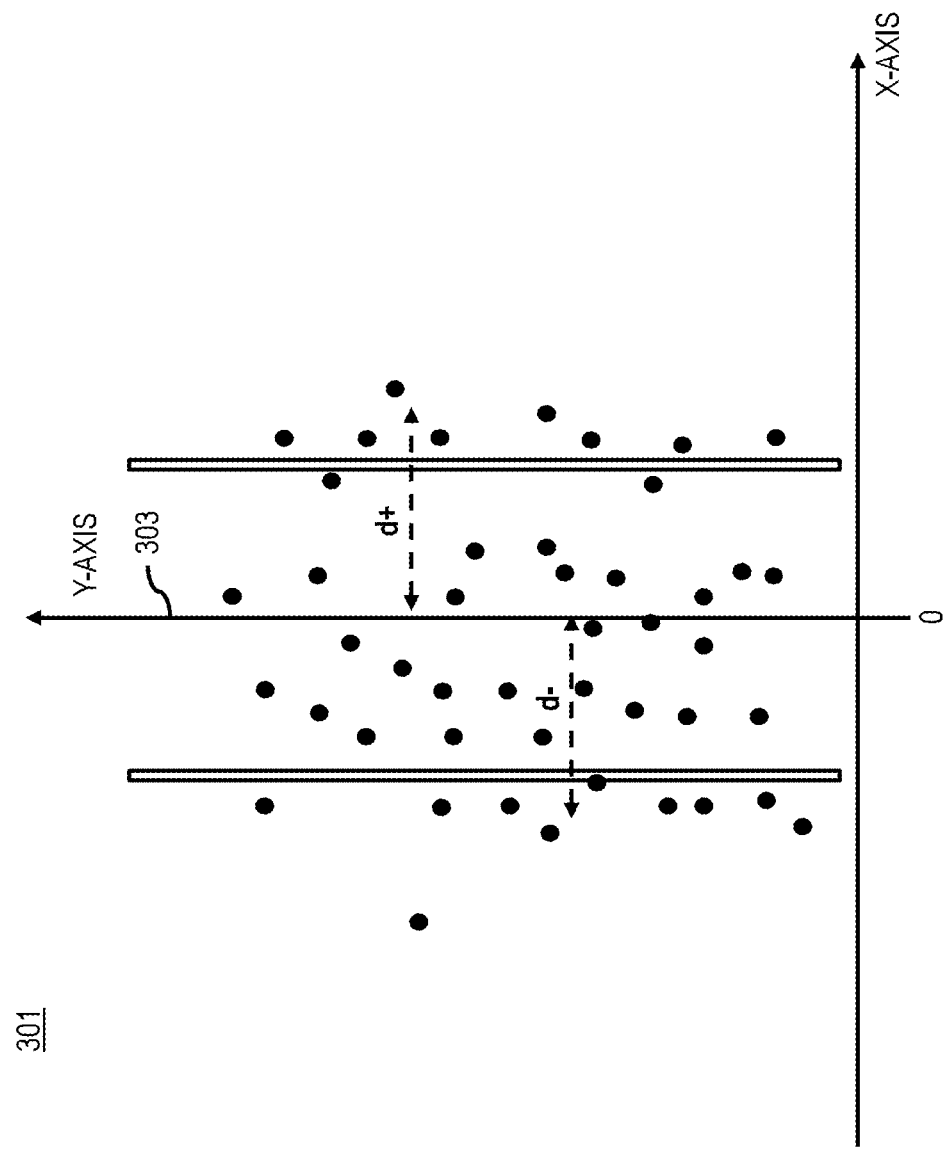
FIG. 3 is a diagram illustrating an example spatial distribution on probe data collected on a road segment, according to one embodiment.

In one embodiment, to solve the problem of ascertaining which speed cluster is on the HOV lane(s) (e.g., left side or other designated side of the road segment) or the rest of the lanes (e.g., right side or other designated side of the road segment), the system 100 uses the spatial distribution of the "raw" probes on a road segment. This distribution is called, for instance, a Vehicle Lane Pattern (VLP) such as the VLP 301 as shown in FIG. 3. The VLP is a representation of the lane distance or d-value metric distance between a raw probe and the center-line or other longitudinal reference line of the road. In the example, the FIG. 3, the reference is the center-line 303 which is marked as zero distance value. In one embodiment, the d-value of a probe is given a negative value if the probe is on the left-side of the reference line 303 and positive value if probe is on the right side of the reference line 303. In one embodiment, when clusters of HS and LS speeds are detected or otherwise generated for probes collected from a road segment, the mean or average d-value (or any other equivalent statistical parameter of the d-value) in each cluster is the metric used to ascertain which of the two clusters is on the right side or on the left of the road segment. Then depending on which side of the road the HOV lane is located as determined from the topology of the road segment (e.g., determined from the map data of the geographic database 113), the assignment of the clusters to a left or right side also assigns the cluster to a corresponding HOV or non-HOV lane.

Figure 4:
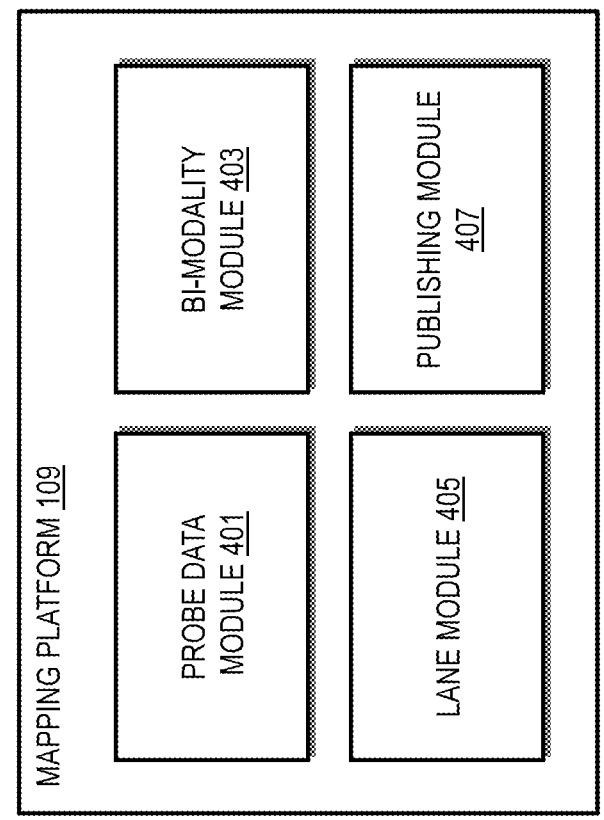
FIG. 4 is a diagram of the components of a mapping platform capable of dynamic speed aggregation of probe data, according to one embodiment.

In one embodiment, as shown in FIG. 4, the mapping platform 105 of the system 100 includes one or more components for dynamic aggregation of probe data for HOV or equivalent lanes according to the various embodiments described herein. It is contemplated that the functions of these components may be combined or performed by other components of equivalent functionality. As shown, in one embodiment, the mapping platform 105 includes a probe data module 401, a bi-modality module 403, a lane module 405, and a publishing module 407. The above presented modules and components of the mapping platform 105 can be implemented in hardware, firmware, software, or a combination thereof. Though depicted as a separate entity in FIG. 1, it is contemplated that the mapping platform 105 may be implemented as a module of any of the components of the system 100 (e.g., a component of the vehicle 101, UE 103, application 107, services platform 114, services 115a-115j (also collectively referred to as services 115), etc.). In another embodiment, one or more of the modules 401-407 may be implemented as a cloud-based service, local service, native application, or combination thereof. The functions of the mapping platform 105 and modules 401-407 are discussed with respect to FIGS. 5-14 below.

Figure 5:
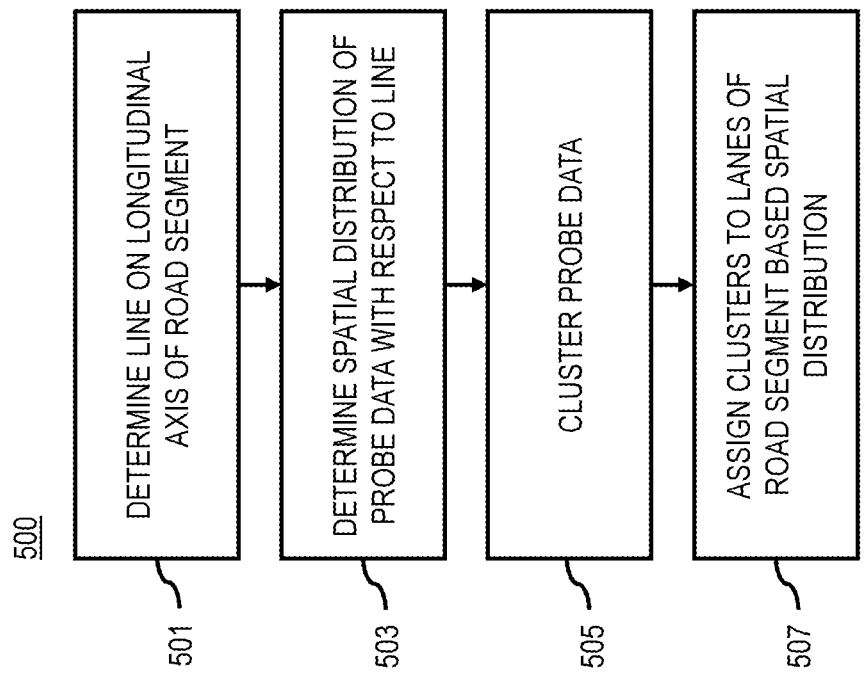
FIG. 5 is a flowchart of a process for providing dynamic speed aggregation of probe data, according to one embodiment.
Figure 17:
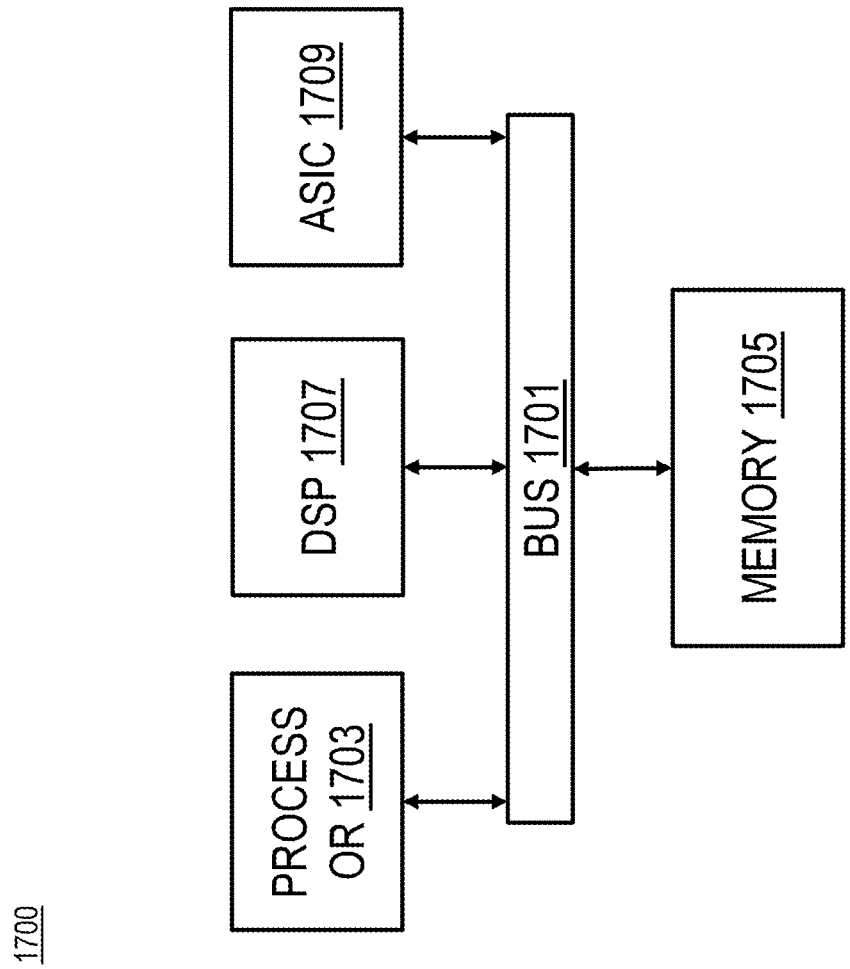
FIG. 17 is a diagram of a chip set that can be used to implement an embodiment.

FIG. 5 is a flowchart of a process for providing dynamic speed aggregation of probe data, according to one embodiment. In various embodiments, the mapping platform 105 and/or any of the modules 401-407 may perform one or more portions of the process 500 and may be implemented in, for instance, a chip set including a processor and a memory as shown in FIG. 17. As such, the mapping platform 105 and/or any of the modules 401-407 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

As discussed above, an HOV road is a road segment with one or more lanes dedicated to faster/express lanes for vehicles 101 that quality based on local transportation authority rules. The location of HOV lanes in the road segment (e.g., usually on the left side) is typically known from the road topology or attribute data stored in the mapping data of the geographic database 113 or equivalent. In one embodiment, the process 500 is part of an HOV traffic event publishing product of the mapping platform 105 comprising the following functions or actions:

Publish lane-level speeds on roads with HOV or equivalent lanes when there is bi-modality in the speed distribution with speed divergence between probe clusters above a threshold;

Optionally ensure that the lower speed (LS) cluster has congestion (e.g., speed below a congestion speed threshold);

Optionally ensure that the published HOV speeds does not overlap with other bi-modal speeds such as but not limited to split lane traffic (SLT);

Optionally aggregate contiguous HOV-road links into a dynamic HOV segment;

Optionally define HOV topology rules/logic for each market, country, jurisdiction, etc. so that local transportation styles or rules are captured; and Optionally identify potential lane-level incidents or congestion incidents (e.g., construction, accident, lane-closures, etc.) that are occurring in HOV lanes (e.g., when LS clusters are assigned to HOV lanes to indicate that traffic is HOV lanes is slower than non-HOV lanes).

In one embodiment, the output of the process 500 (e.g., published HOV traffic events) can be used for any number of use cases including but not limited to: (1) lane-level guidance; (2) routing and estimated-time-of-arrival (ETA) calculation; (3) map display; and (4) transportation planning.

In one embodiment, the mapping platform 105 can perform the process 500 on any road segment for which probe data has been collected or monitored. The probe data can include historical and/or real-time data. For example, historical probe data can be collected over a period of time and the processed offline or in a batch process to determine historical HOV traffic events or patterns. In other use cases, the process 500 can be performed on real-time as probe data is collected from vehicles 101 traveling on a monitored road segment. For example, the real-time data can include data collected over a most recent time epoch (e.g., a 10-minute time epoch) that is updated with newly collected probe data at a designated frequency (e.g., updated every 1 minute) to identify real-time HOV traffic events. In either use case, HOV traffic events, for instance, can refer to identifying bi-modality speeds occurring on a road segment known (e.g., from the geographic database 113) to include an HOV lane.

In one embodiment, the probe data module 201 can select appropriate road segments to monitor. For example, a road segment can be selected based on determining that it has a road topology indicating that the high-occupancy-vehicle traffic event can be published for the road segment. Hence an HOV topology specification can be created. For example, the HOV topology specification can select a road segment to monitor based on identifying road segments with HOV lanes that have properties including but not limited to:

An HOV segment breaks on split-lane exits, major intersections, or merges with entry on the HOV lanes;

An HOV segment will have a least a designated minimum length (e.g., 300 meters) and no maximum length;

An HOV segment or strand will have intrinsic road link-IDs in contiguous order (e.g., starting from the last downstream link L1 to the start of an upstream link Ln); and An HOV segment or strand will have a labeled segment-ID, e.g., <first-link-ID_last-link-ID>.

Figure 6:
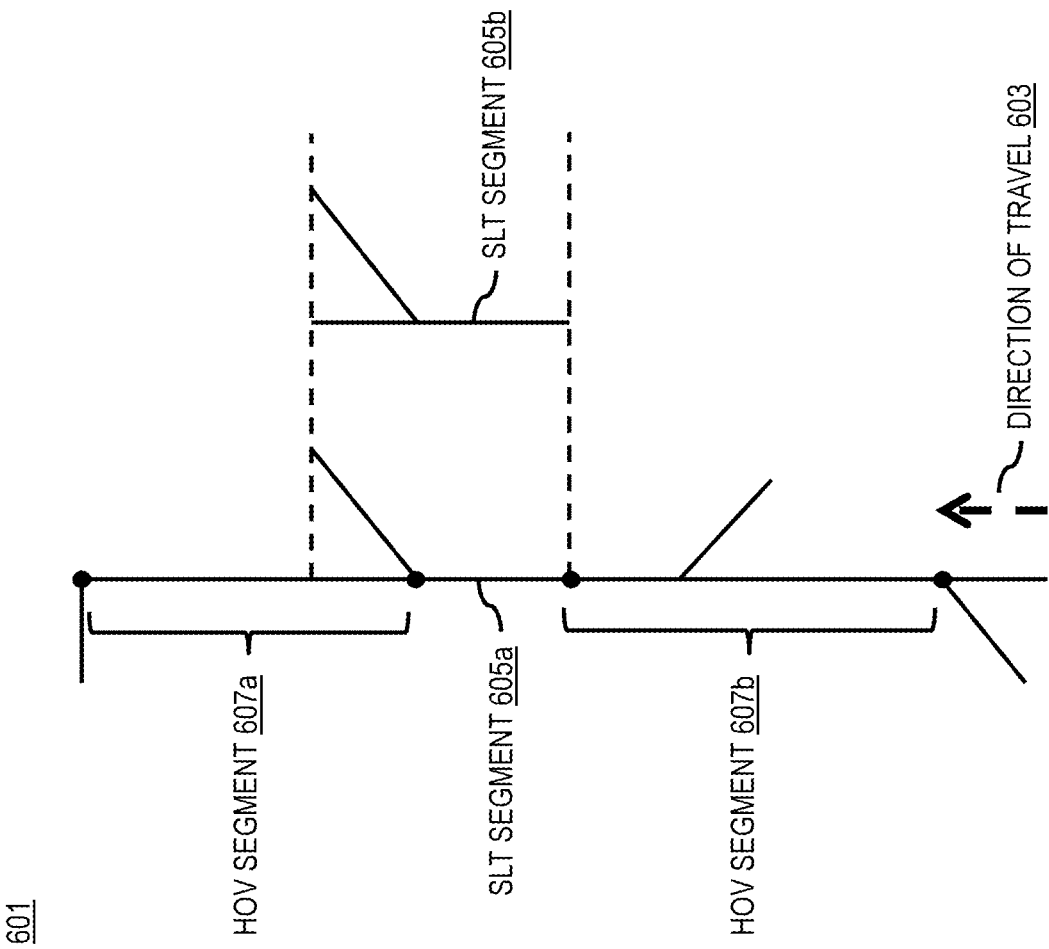
FIG. 6 is a diagram illustrating an example of an HOV lane topology, according to one embodiment.

As shown in the example HOV topology 601 of FIG. 6 with a direction of travel 603, the topology specification described above indicates that the HOV topology 601 would break around exits (e.g., because this is already in SLT topology and exits are not compatible with the HOV algorithm) and it continues to be stranded across merges (i.e., does not break) as merges can only further slow-down the non-HOV lanes on the right. Using this technique, the probes from road segments within the SLT topology (e.g., SLT segments 605a and 605b just before exit ramps) are not used for HOV speed computation, rather the speed is obtained from the upstream (before SLT) and downstream (after SLT) probes speeds for HOV segments 607a and 607b which meet the HOV topology specification.

In one embodiment, after selecting or otherwise determining the road segment to process, the mapping platform 105 can initiate the process 500 to detect and publish the HOV traffic events (e.g., HOV traffic speeds) according to the embodiments described herein. For example, the mapping platform 105 can generate a lane distance metric (e.g., d-value) for each or a selected number of probes of the probe data collected from the monitored road segment. Accordingly, in step 501, the lane module 405 determines a line (e.g., a reference line) that is parallel to the road segment and divides that road segment along a longitudinal axis. In one embodiment, the reference line can include but is not limited to a center-line of the road segment. Alternatively, the reference line can be any other line that can be used to divide HOV lanes from non-HOV lanes on the road segment. For example, if the road segment has four lanes with the leftmost lane being an HOV lane and the three rightmost lane being non-HOV lanes (e.g., as determined from the map data of the geographic database 113), the line can be defined at one quarter the distance from the left edge to the right edge of the road segment.

After determining the reference line, the probe data module 401 can then determine a spatial distribution of probe data collected from the road segment with respect to the line (step 503). In other words, the spatial distribution can specify the relative distances of probes in the probe data using a lane distance metric based on the reference line. In one embodiment, the lane distance metric can be defined as the closest perpendicular distance from the probe raw position to a segment of the link represented by the reference line. For example, when the reference line is the center-line, the distance metric represents the distance from the center of the road.

Figure 7:
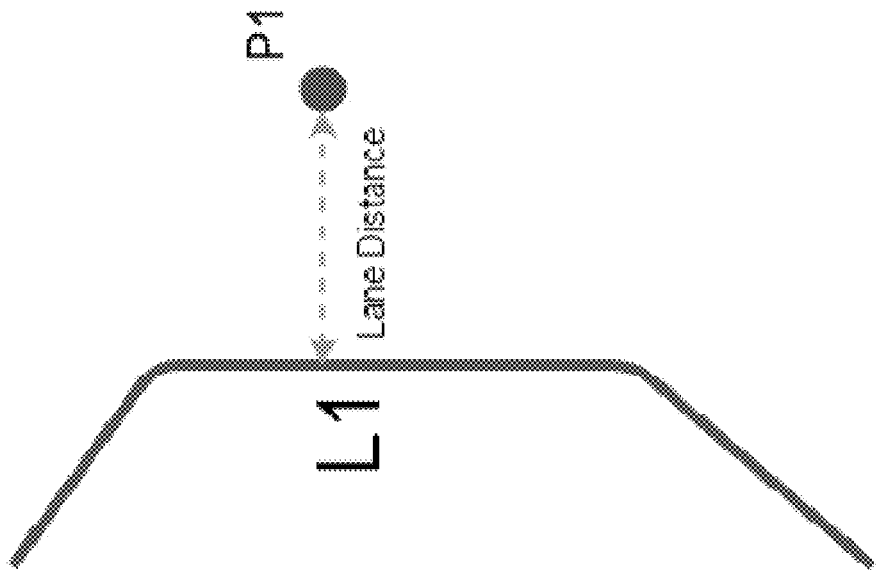
FIG. 7 is a diagram illustrating an example lane distance for a probe collected on a road segment, according to one embodiment.

This is illustrated in the example 701 of FIG. 7 wherein a lane distance between the probe P1 and the road link L1 is the closest perpendicular distance between the probe P1 and a reference line of the road link L1. In one embodiment, the lane distance is computed through a series of geometrical formulas, where the geo-coordinates of the probes and road segment/reference line are treated as if they were points in a 2D space. Because of the generally very short distances that the mapping platform 105 is dealing with, the spherical shape of the earth does not affect this simplification in any significant way. By way of example, the link of interest is first divided into segments, where each segment is defined by a couple of consecutive shape points. Then, for each segment the algorithm calculates the lane distance for the probe using the process indicated in the example code below:

```
function distancePointFromSegment (p, seg1, seg2) {
    let aX = seg2.lng - seg1.lng;
    let aY = seg2.lat - seg 2.lat;
    let bX = p.lng - seg1.lng;
    let bY = p.lat - seg 1.lat;
    let dotProd = aX * bX + aY * bY;
    let sqDist = aX * aX + aY * aY;
```

-continued

```
    if (sqDist === 0) {
        return eulerDist (p, seg1);
    }
    let component = dotProd / sqDist;
    let closest = {lat: 0, lng:0};
    if (component <= 0) {
        closest = seg1;
    } else if (component >= 1) {
        closest = seg2;
    } else {
        closest.lng = seg1.lng + aX * component;
        closest.lat = seg1.lat + aY * component;
    }
    return eulerDist (p, closest);
}
```

The core function of the code illustrated above is to define both the probe and the segment as vectors, then through the use of the dot product, the code finds the closest point to the probe on the line defined by the segment. If the point is inside the segment, it returns the distance between that point and the probe, otherwise it returns the distance to the closest shape point of the segment.

After computing the lane distance for each of these segments (e.g., using the code described above or equivalent), the probe data module 401 choses the lowest one to be the actual lane distance for the probe. Finally, the lane module 405 needs to determine which side of the reference line representing the link the probe is on, in order to choose the sign for the already computed lane distance. As shown in FIG. 3, in one embodiment, the probe distance on the left carries a negative sign while the distance on the right carries a positive sign. To do this, the probe data module 401 can use once again the previously mentioned dot product in the vector form: the sign of the dot product represents the side of the link the probe is on.

Figure 8:
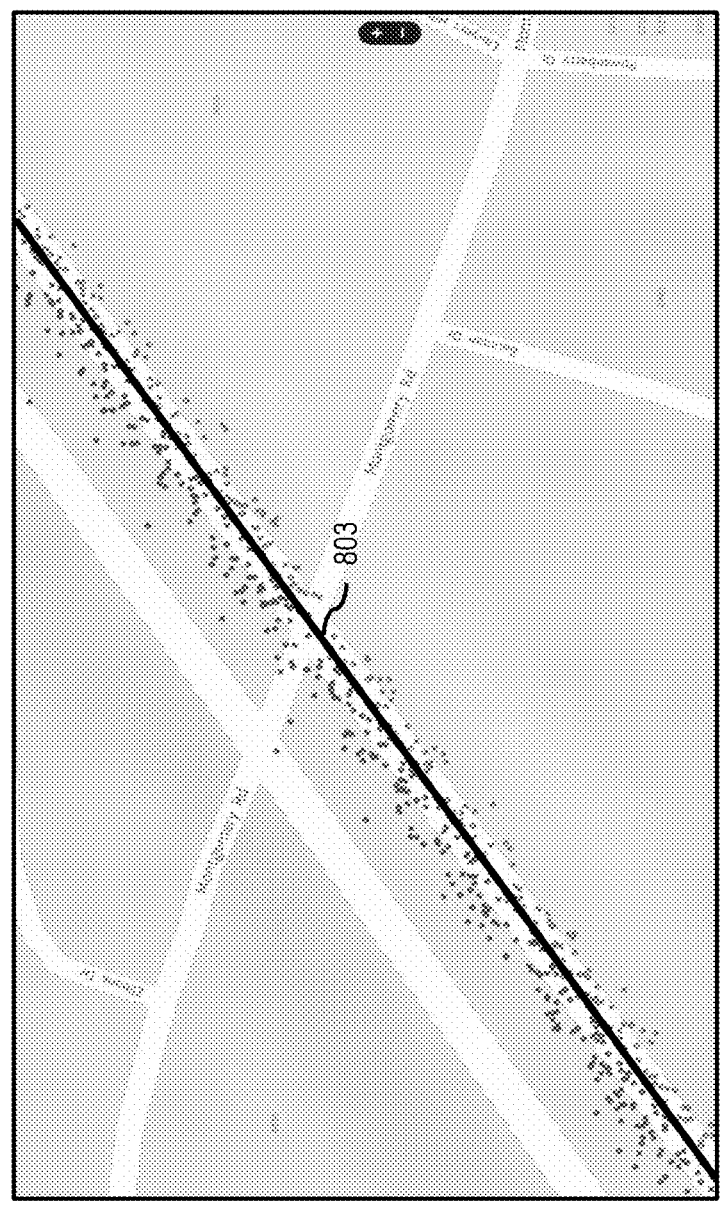
FIG. 8 is a diagram illustrating an example spatial distribution of probes collected on a road segment, according to one embodiment.

After determining the spatial distribution of all or a designated portion of the probes of the probe data, the result is that each evaluated probe now has an attribute that specifies its lane distance metric or d-value (e.g., distance from the centerline) that is directly proportional to the actual lane the vehicle 101 that produced the probe is on. So, if a probe has a lower lane distance from centerline than another one, it is probably travelling on a lane that is closer to the centerline. FIG. 8 is a diagram illustrating an example spatial distribution 801 of probes collected on a road segment, according to one embodiment. As shown, the location of probe is represented by a dot relative to the centerline 803 of the road segment being evaluated. Probes located to the left of the centerline 803 have negative d-values and probes to the right of the centerline have positive d-values.

In step 505, the bi-modality module 403 then clusters the probe data into, for instance, a first cluster and a second cluster based on speed. In other words, now that the bi-modality module 403 has the lane distance metric or attribute, the bi-modality module 403 can start looking for bi-modal speed events using any speed clustering means including but not limited to the bi-modality detection and clustering (BDC) illustrated in the pseudocode described below or equivalent:

```
V ← {a list of probe speeds in an epoch}
function BDC(V):
    s ← STD(V)
    m ← mean(V)
    V ← V ∀ V < m + 2s & V > m - 2s    //first outlier filtering
    d ← Range(V)/8
```

```
for i ← 1 to 8          //bucketizing
    b_i ← {V ∀ V < max (V) & V > (max (V) − d)}
    V ← V − b_i
end for
V ← b_1 + b_2 + ... + b_16    //restore V
for i ← 2 to 8          //cluster search
            mean(b_1) − mean(b_i)
    MG ← ─────────────────────
                Range(V)
    if |b_1| > 2 and MG > 0.4 and |V − b_1| > 2    //2 & 0.4 are tuning parameters
    then return {mean(b_1), mean(V − b_1)}
    else b_1 ← b_1 + b_i
    end if
end for
end BDC
```

Figure 9:
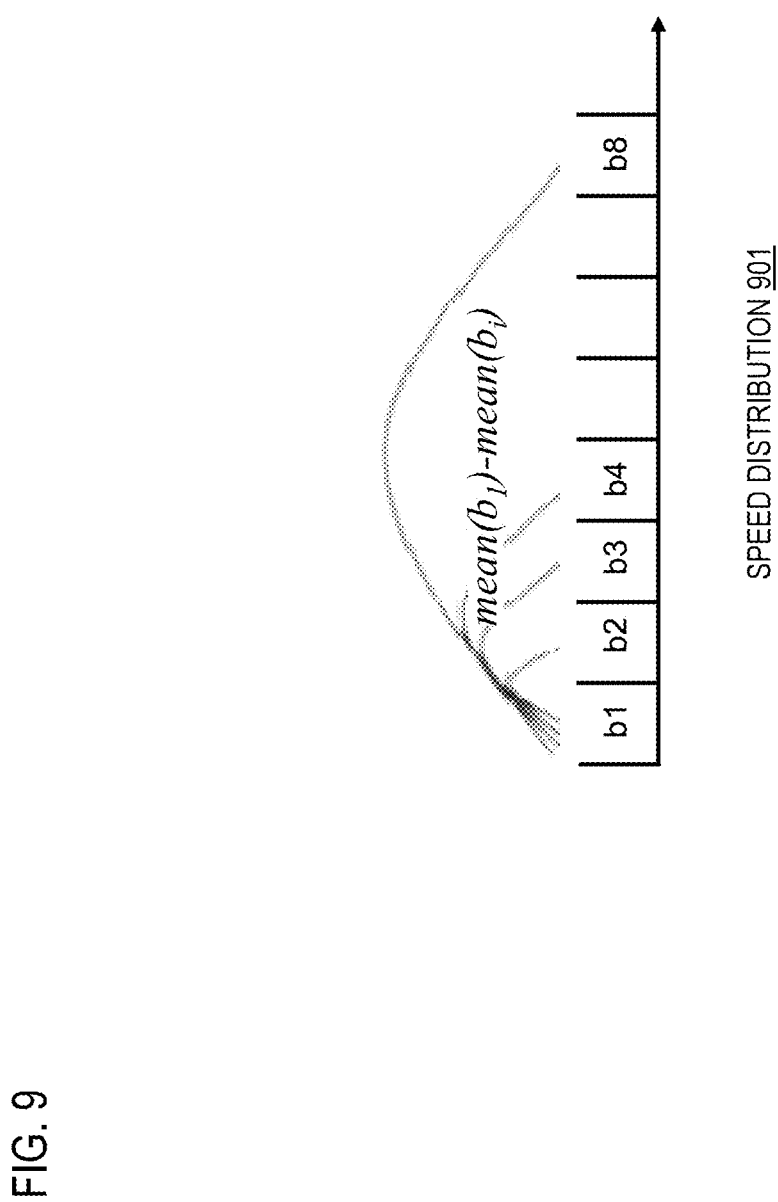
FIG. 9 is a diagram illustrating bi-modality detection and clustering, according to one embodiment.

As shown in FIG. 9, the example BDC function (e.g., function BDC(V)) illustrated above processes a distribution of a list of probe speeds (V) collected in over a time epoch of interest to determine statistical parameters (e.g., standard deviation and mean of V) to filter outliers. The remaining probes in the V are then assigned to different a designated number of buckets (e.g., eight buckets in this example). The BDC function then identifies clusters by determining which buckets can be clustered based in part by calculating in part the following to determine whether combine buckets into clusters:

$$MG \leftarrow \frac{\text{mean}(b_1) - \text{mean}(b_i)}{\text{Range}(V)}$$

The BDC process can be iterated over the buckets (e.g., b1-b8) of the speed distribution 901 to detect when there is a bi-modal distribution in the probes on a link based on designated tuning parameters. The bi-modal distribution can indicate that one cluster of probes is moving significantly faster (e.g., greater that a speed difference threshold) that another cluster of probes. For example, one cluster may correspond to the HOV lane probes and the other cluster may correspond to the non-HOV lane probes. The bi-modality module 403 is able to detect this and send or output the average speeds for the two different speed clusters. When there is no bi-modality, the bi-modality module 403 would return the average speed for the entire set of probes. Running the BDC process on different "possible" sets of probe data would produces different HS and LS cluster speeds as illustrated the examples below:

Probe Data Set 1 with the following probe speed values:
[0.0 kph, 35.0 kph, 19.0 kph, 5.0 kph, 42.0 kph, 25.0 kph, 10.0 kph]
HS Cluster mean speed=30.25 kph
LS Cluster mean speed=5.0 kph Probe Data Set 2 with the following probe speed values:
[16.0 kph, 35.0 kph, 35.0 kph, 2.0 kph, 18.0 kph, 3.0 kph, 21.0 kph, 4.0 kph, 36.0 kph, 6.0 kph, 6.0 kph, 8.0 kph, 9.0 kph]
HS Cluster mean speed=35.3 kph
LS Cluster mean speed=9.3 kph Probe Data Set 3 with the following probe speed values:
[1.0 kph, 32.0 kph, 21.0 kph, 20.0 kph, 24.0 kph, 12.0 kph, 14.0 kph, 14.0 kph]
HS Cluster mean speed=19.6 kph
LS Cluster mean speed=1.0 kph Probe Data Set 4 with the following probe speed values:
[1.0 kph, 16.0 kph, 19.0 kph, 38.0 kph, 36.0 kph, 52.0 kph, 8.0 kph, 9.0 kph, 29.0 kph, 28.0 kph]
HS Cluster mean speed=31.1 kph
LS Cluster mean speed=6.0 kph Probe Data Set 5 with the following probe speed values:
[49.0 kph, 38.0 kph, 20.0 kph, 66.0 kph, 40.0 kph, 28.0 kph, 34.0 kph, 35.0 kph, 33.0 kph, 38.0 kph, 39.0 kph, 40.0 kph, 41.0 kph, 11. kph 0, 44.0 kph, 14.0 kph, 17.0 kph, 17.0 kph, 17.0 kph, 49.0 kph, 48.0 kph, 18.0 kph, 20.0 kph, 25.0 kph, 27.0 kph, 26.0 kph]
HS Cluster mean speed=37.3 kph
LS Cluster mean speed=16.8 kph Probe Data Set 6 with the following probe speed values:
[19.0 kph, 20.0 kph, 57.0 kph, 60.0 kph, 31.0 kph, 15.0 kph, 19.0 kph, 59.0 kph, 18.0 kph, 20.0 kph, 19.0 kph, 55.0 kph]
HS Cluster mean speed=57.8 kph
LS Cluster mean speed=20.1 kph In one embodiment, the bi-modality module 403 can detect an occurrence of a bi-modality event by comparing the speed difference between the HS and LS clusters to a difference threshold (e.g., 20 kph). In the examples above, all of the HS and LS clusters differ by more than the difference threshold, and therefore each Probe Data Set 1-6 has a corresponding detected bi-modality event. In step 507, the lane module 405 can then assign the clusters to lanes of the road segment based on the determined spatial distribution (e.g., lane distance metrics) to the probes in the clusters. For example, the lane module 405 assigns the first cluster to the first lane (e.g., HOV lane) of the road segment, the second cluster to the second lane (e.g., non-HOV lane) of the road segment, or a combination thereof based on the spatial distribution. In other words, once a bimodality event is detected by the bi-modality module 403, the lane module 405 can process the clusters and their spatial distributions to determine if the detected bi-modality event is what the mapping platform 105 is looking for in one embodiment: an HOV lane that allows drivers to travel significantly faster than the other lanes because of the lack of traffic. It is contemplated that further qualification of the detected bi-modality event is an optional process. Accordingly, in some embodiments, the output module 407 can publish the detected bi-modality event as an HOV traffic event without further processing.

In cases where further processing is configured or requested (e.g., to determine when HOV lanes will enable a user to travel faster that non-HOV lanes or vice versa), the bi-modality module 403 can perform further processing to reject the bi-modality events where there is no congestion, just a difference in speeds. In one embodiment, the bi-modality module 403 does this by rejecting all the events where the Low Speed (LS) probe cluster is faster than a free-flow speed threshold. For example, the threshold can be set at 72.7% (or any other percentage or value) of Free Flow of non-congestion speed of the road link. If the probes of the LS closer is traveling faster than this threshold speed, the bi-modality module 403 assumes that there is no congestion on the road link and can reject the bi-modality event for further processing to determine an HOV traffic event (e.g., where HOV lanes can provide for faster travel than non-HOV lanes on a road segment). For example, when such events are detected, the output module 407 can publish the event so that routing engines can guide users to take the HOV lanes to improve travel times if the user is qualified to take HOV lanes.

In one embodiment, the bi-modality module 403 can optionally further determine if the faster speed is actually on the HOV lane, and not on one of the regular non-HOV lanes. For example, this situation could happen close to intersections, e.g., referred to as Split Lane Traffic. The bi-modality module 403 interacts with the lane module 405 to use the lane distance metric determined above to decide whether the HS cluster is on the HOV lane. The bi-modality module 403 then computes the median or mean lane distance of the probes that belong to the two speed clusters and uses these median or mean values to decide if the HS cluster in on the left or on the right with respect to the LS cluster. If the HOV lane is on the leftmost lane, the bi-modality module 403 rejects all the events where the LS cluster is on the left side of the HS (or vice versa if the HOV lane is on the rightmost lane). In another embodiment, the bi-modality module 403 can apply other event rejection criteria including but not limited to rejecting the case where HOV lanes are congested (as this could be a real incident or delay on toll-gate on the HOV lanes). The selection on of option rejection criteria can depend on system administrator and/or user preference.

Figure 10A:
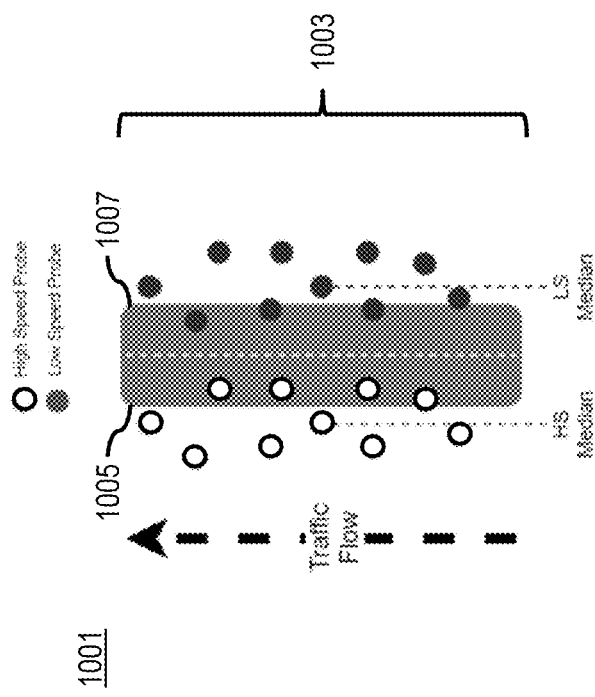
FIGS. 10A and 10B are diagrams illustrating examples of detecting HOV/bi-modality events, according to one embodiment.
Figure 10B:
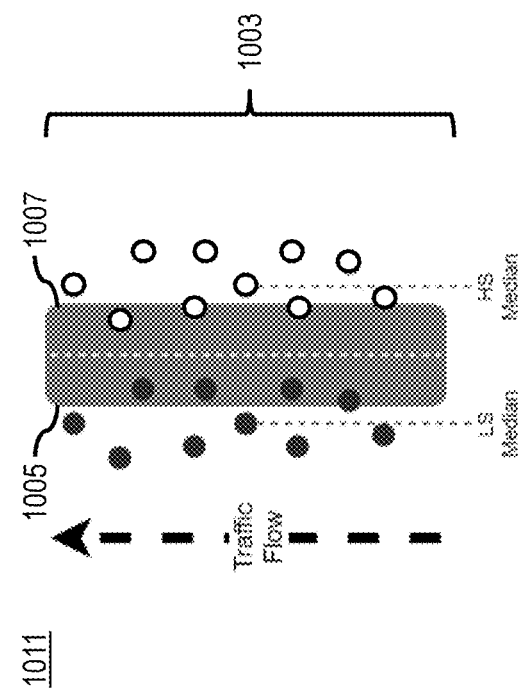

FIGS. 10A and 10B are diagrams illustrating examples of detecting HOV/bi-modality events, according to one embodiment. In the examples 1001 and 1011 of FIGS. 10A and 10B, the mapping platform 105 collects probe data from the vehicles 101 traveling on a road segment 1003 and then uses the embodiments of the BDC process described above to detected that the probe data exhibit a bi-modality of probe speeds. For example, the BDC process can be used to identify a cluster of high speed (HS) probes and a cluster of low speed (LS) probes and their respective lane distances from the centerline of the road segment 1003 (e.g., a HS median lane distance and LS median lane distance). The mapping platform 105 can then determine the location of the HOV lane 1005 and/or non-HOV lane 1007 on the road segment 1003, for instance, from the map data of the geographic database or jurisdictional preferences (e.g., in the United States, HOV lanes usually are located on the leftmost lane(s) on highways). In this example, the HOV lane 1005 is on the left of the road segment 1003 and the non-HOV lane 1007 is on the right of the road segment 1003 for purposes of illustration. Based on the location of the HOV lane 1005 and/or non-HOV lane 1007, the mapping platform 105 assigns the HS and LS clusters accordingly.

In example 1001, the median of the HS cluster is located to the left of the centerline of the lane, and the median of the LS cluster is located to the right of the centerline of the lane. Therefore, the HS cluster is assigned to the HOV lane 1005 and LS cluster is assigned to the non-HOV lane 1007. This is the typical situation where HOV traffic usually runs faster than non-HOV traffic when there is congestion on the road segment 1003. In example 1011, the opposite is true with the median of the LS cluster located to the left and the median of the HS cluster located to the right. Therefore, in example 1011, the LS cluster is assigned to the HOV lane 1005 and the HS cluster is assigned to the non-HOV lane 1007. While this situation may be atypical, it can occur, for instance, when there is a traffic incident, construction, congestion, etc. on the HOV lane 1005 and not on the non-HOV lane 1007. In some embodiments, this atypical situation can be used for certain uses cases where the detection of slow HOV speeds relative non-HOV speeds is desired. In other embodiments, identification of this atypical situation can be used reject the detected HOV/bi-modality traffic event for publication (e.g., when historical data indicates that this situation is rare or when a system administrator or user employs the situation as a rejection criterion).

In one embodiment, the output module 407 can then publish the detected HOV/bi-modality event, for instance, as an HOV artifact of the geographic database 113. In one embodiment, the output module 407 is able to publish detected HOV traffic events on a link-level detail. In some cases, due to the differences in link lengths, the mapping platform 105 can aggregate the HOV events that are close to each other. For example, the lane module 405 can aggregate this sequence of contiguous links experiencing an HOV event to produce a dynamic segment as described below with respect to FIG. 11.

Figure 11:
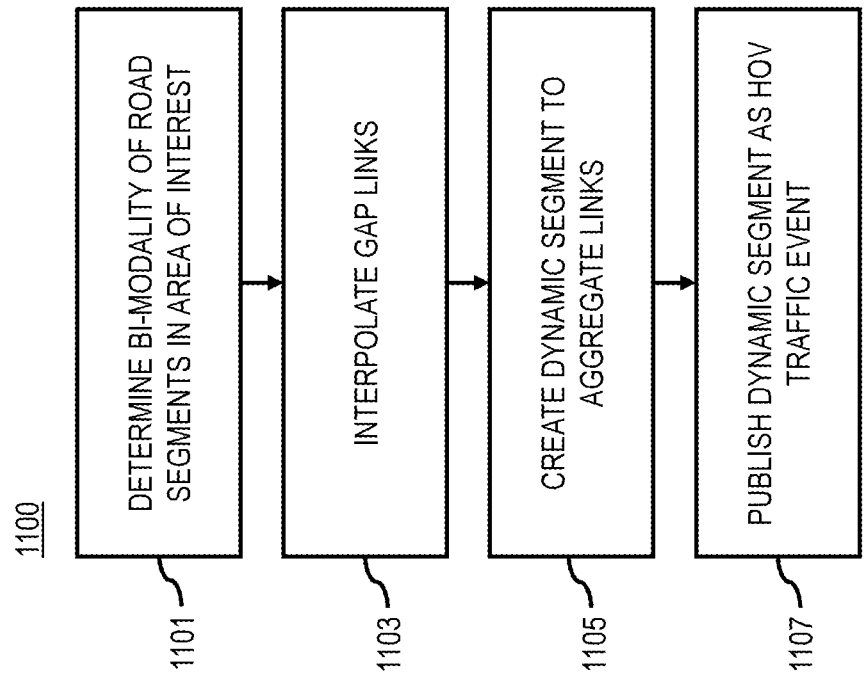
FIG. 11 is a flowchart of a process for generating a dynamic HOV segment, according to one embodiment.

FIG. 11 is a flowchart of a process for generating a dynamic HOV segment, according to one embodiment. In various embodiments, the mapping platform 105 and/or any of the modules 401-407 may perform one or more portions of the process 1100 and may be implemented in, for instance, a chip set including a processor and a memory as shown in FIG. 17. As such, the mapping platform 105 and/or any of the modules 401-407 can provide means for accomplishing various parts of the process 1100, as well as means for accomplishing embodiments of other processes described herein in conjunction with other components of the system 100. Although the process 1100 is illustrated and described as a sequence of steps, it is contemplated that various embodiments of the process 1100 may be performed in any order or combination and need not include all of the illustrated steps.

Figure 12:
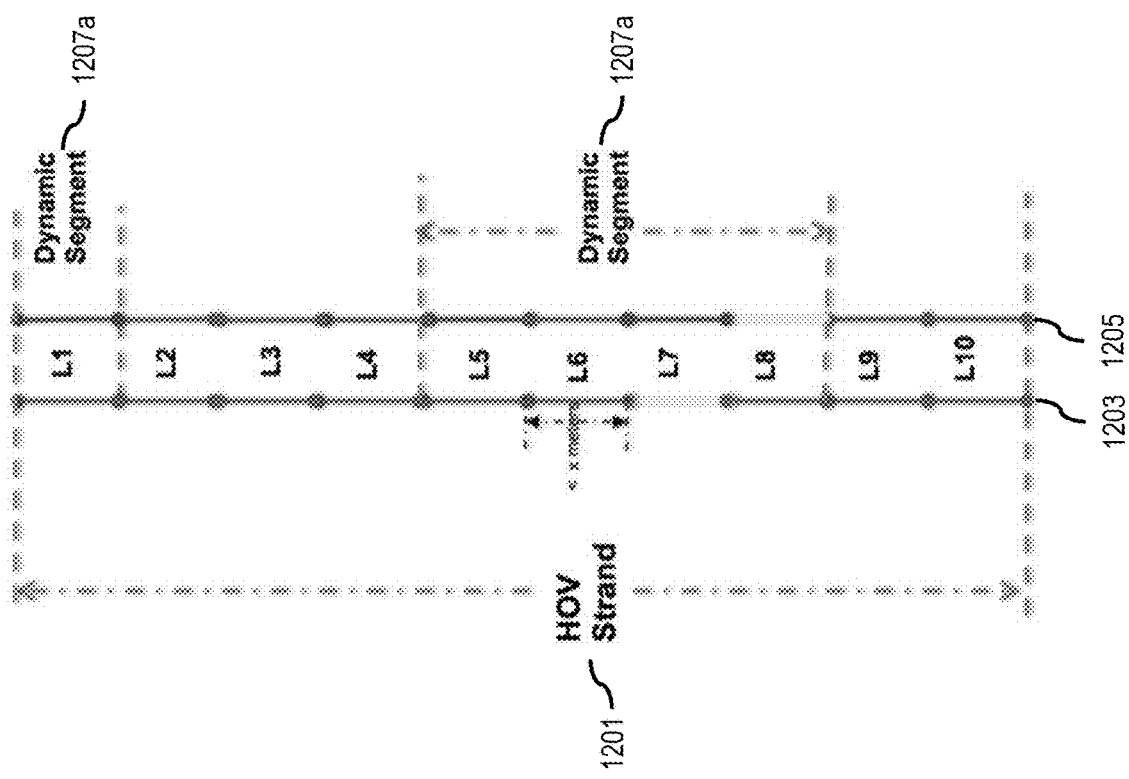
FIG. 12 is a diagram illustrating an example of dynamic segmentation of road segments with HOV lanes, according to one embodiment.

In step 1101, the mapping platform 105 can select an area of interest including road segments or links from which probe data is collected for detecting HOV/bi-modality events (e.g., according to the embodiments of the process 500 of FIG. 5). In other words, the mapping platform 105 can run the BDC process on all road links in the area of interest to generate the HOV artifact or traffic event for the road links or segments. In one embodiment, the HOV artifact is defined as an ordered list of contiguous links with an HOV lane, the mapping platform 105 uses these properties to aggregate multiple links experiencing similar events if they are part of a single major event. For example, as shown in the example of FIG. 12, an HOV strand or road 1201 includes an HOV lane 1203 and non-HOV lane 1205 segmented into links L1-L10 that are x-meters in length. HOV events detected on links L1-L10 can then be aggregated into dynamic segments 1207a and 1207b according to the embodiments of the process 1100.

In step 1103, the mapping platform 105 begins the dynamic segment creation process by interpolating gap-links of segment length less than a threshold length (e.g., x meters). In other words, in one embodiment, the mapping platform 105 only needs a simple parameter: the maximum distance between two events for them to be considered the same. This aggregation or interpolation of gap-links is used because some links might be very short, and/or the mapping platform 105 might not receive enough probes on them to detect an HOV event.

In step 1105, the mapping platform 105 creates a dynamic segment to aggregate into the dynamic segment all contiguous links in which a bi-modality between HS and LS probe speeds have been detected (e.g., using embodiments of the BDC process). In one embodiment, the mapping platform 105 performs an in-order scan of the links list, and each time an HOV event is detected on a link, a new dynamic segment is created. The mapping platform 105 then analyzes the links after the beginning of the dynamic segments: if a link is experiencing an event, it adds it to the dynamic segment, otherwise it sums its length to a variable associated with the dynamic segment and it keeps the link "on hold". If the value of this variable becomes greater than the maximum distance parameter, the system forgets the links "on hold" and publishes the dynamic segment. If another link experiencing an HOV event is found before the variable reaches the maximum distance, all the links "on hold" are added to the dynamic segment along with the HOV link and the variable is cleared. For example, in the example of FIG. 12, dynamic segment 1207a aggregates just link L1, and dynamic segment 1207b aggregates links L5-L8 based on the aggregation rules above. The mapping platform 105 can then publish the dynamic segments as respective HOV traffic events (step 1107).

Example pseudocode for the dynamic segment process is provided below:

```
isInSegment = false;
cumDist = 0;
gapLinks = [ ];
segment = [ ];
for link in artifact {
    if (isInSegment) {
        if HOV(link) {
            segment <- gapLinks;
            segment <- link;
            cumDist = 0;
            gapLinks = [ ];
        } else {
            if (cumDist + length(link) <= MAX_GAP) {
                cumDist += length(link);
                gapLinks <- link;
            } else {
                gapLinks = [ ];
                cumDist = 0;
                publish(segment);
                segment = [ ];
                isInSegment = false;
            }
        }
    } else {
        if HOV(link) {
            segment <- link;
            isInSegment = true;
        }
    }
}
```

Figure 13:
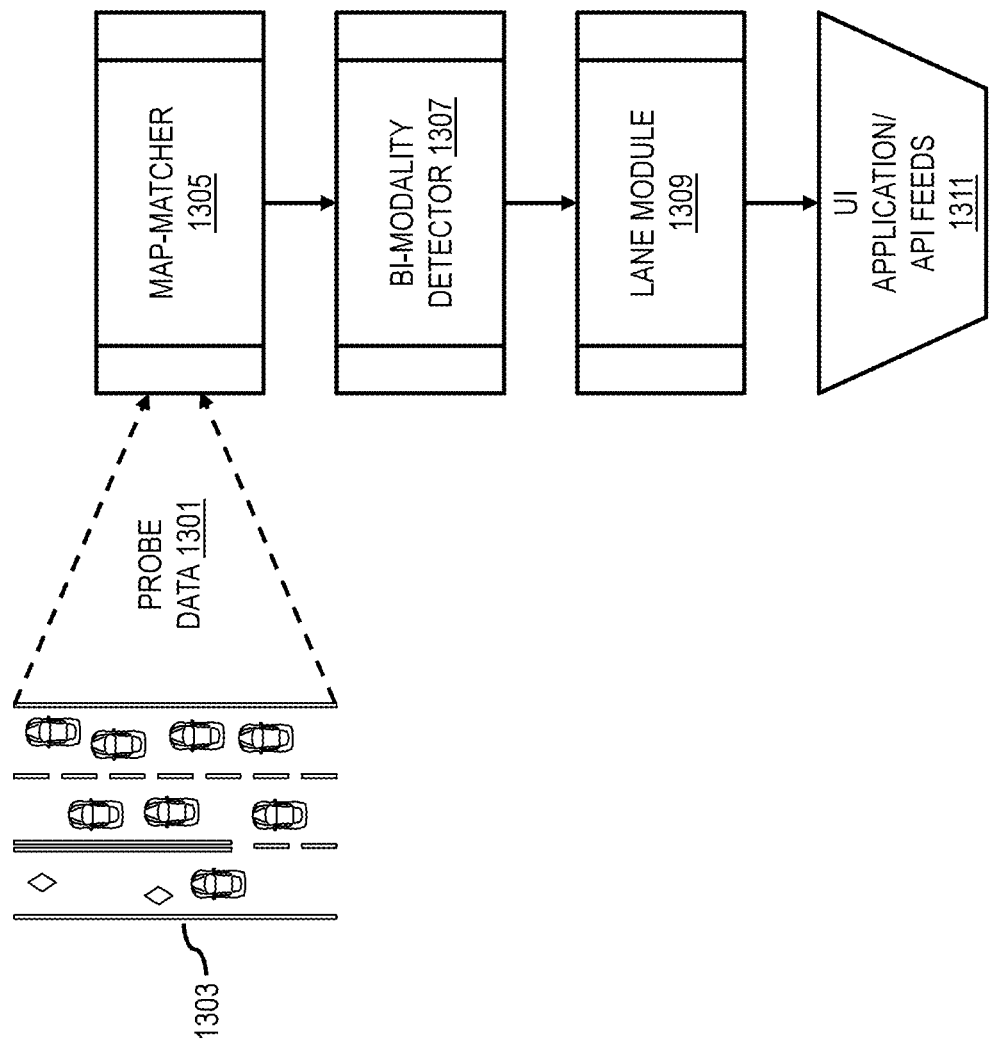
FIG. 13 is a diagram illustrating an example architecture and data flow for dynamic speed aggregation of probe data, according to one embodiment.

FIG. 13 is a diagram illustrating an example architecture and data flow for dynamic speed aggregation of probe data, according to one embodiment. In one embodiment, the data flow begins from collecting probe data 1301 from vehicles traveling on a road segment 1303 including HOV and non-HOV lanes. The probe data 1301 is provided to a map-matcher 1505 that uses any known map-matching process known in the art to convert the geo-coordinates of the collected probes to Link IDs of corresponding road segments. In addition, the map-matcher 1505 alone or in combination with other components of the mapping platform 105 can determine respective lane distances for each probe to output the following for each road link: Link-ID (Probes[ ], t, (d-values)), wherein Link-ID identifies the road segment, Probes[ ] are a list of probes and speed values, t is the time or epoch at which the probes were collected, and d-values are the respective lane distances of the Probes[ ].

The Link-ID(Probes[ ], t, (d-values)) is then transmitted from the map-matcher 1305 to a bi-modality detector 1307 for bi-modality detection and clustering (e.g., using embodiments of the BDC process described above). The output of the bi-modality detector 1307 includes the following for each road link: Link-ID((HS, LS, t), (d-values)), where HS represents a detected high speed probe cluster, LS represents a detected low speed cluster, t is the time or epoch at which the probes were collected, and d-values are the respective lane distances of the probes in the clusters.

The Link-ID((HS, LS, t), (d-values)) is then transmitted from the bi-modality detector 1307 to the lane module 1309. The lane module 1309, for instance, provides logic for using the d-values in determining which side of the road the LS and HS speed clusters are located, including matching the clusters to HOV or non-HOV lanes (e.g., based on known locations of HOV and non-HOV lanes stored in geographic database 113, provided by a transportation authority, and/or the like). The output of the lane module 1309 can include for each analyzed link: Link-ID(HOV-Avg-speed, non-HOV-Avg-speed, t), wherein HOV-Avg-speed is the average speed of the cluster assigned to the HOV lane, non-HOV-Avg-speed is the average speed of the cluster assigned to the non-HOV lane, and t is the time or epoch at which the probes were collected.

Figure 14:
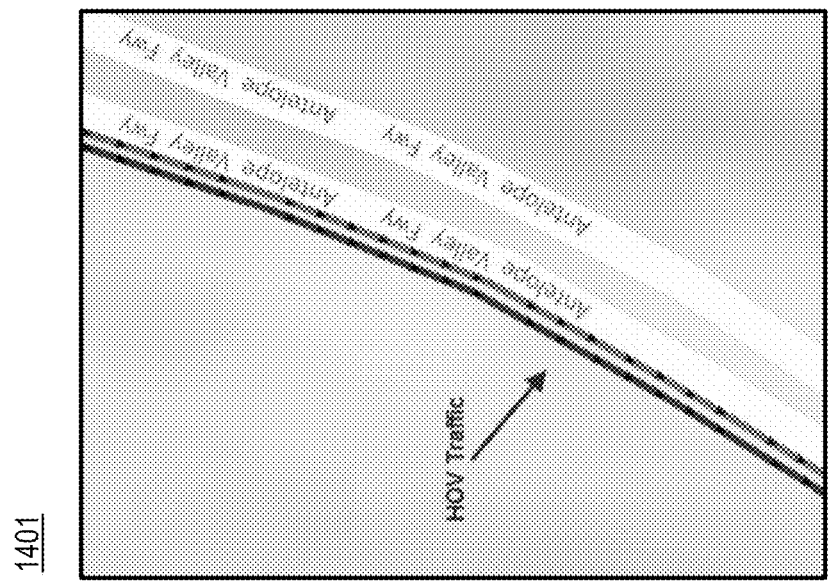
FIG. 14 is a diagram of an example mapping user interface for displaying published HOV traffic event data, according to one embodiment.

The Link-ID(HOV-Avg-speed, non-HOV-Avg-speed, t) is then transmitted form the lane module 1309 to the UI Application/Application Programming Interface (API) feeds 1311 for publishing or use by other applications and/or services. FIG. 14 is a diagram of an example mapping user interface (UI) 1401 for displaying published HOV traffic event data, according to one embodiment. As shown, the mapping UI 1401 presents a representation of a road segment with HOV lanes and non-HOV lanes with differential representations of the average HOV speed and the average non-HOV speed determined for the road segment according to the embodiments described herein.

Returning to FIG. 1, in one embodiment, the mapping platform 105 of system 100 has access to a geographic database 113 to provide location-based services based on the dynamic speed aggregation or probe data according to the embodiments described herein. The mapping platform 105 can operate, for instance, in connection with one or more UEs 103 (e.g., mobile devices) that can be carried by a user as a pedestrian or in a car (e.g., vehicle 101). Though depicted as automobiles, it is contemplated the vehicles 101 can be any type of transportation vehicle manned or unmanned (e.g., planes, aerial drone vehicles, motor cycles, boats, bicycles, etc.). Alternatively, the UE 103 may be a personal navigation device ("PND"), a cellular telephone, a mobile phone, a personal digital assistant ("PDA"), a watch, a camera, a computer and/or any other device that supports location-based services, i.e., digital routing and map display. It is contemplated that a device employed by a pedestrian may be interfaced with an on-board navigation system of a vehicle 101 or wirelessly/physically connected to the vehicle 101 to serve as the navigation system. Also, the UE 103 may be configured to access the communication network 111 by way of any known or still developing communication protocols.

Also, the vehicle 101 and/or UE 103 may be configured with an application 107 for collecting probe data and/or for interacting with one or more content providers 117, services 115 of a services platform 114, or a combination thereof. The application 107 may be any type of application that is executable on the vehicle 101 and/or UE 103, such as mapping applications, location-based service applications, navigation applications, content provisioning services, camera/imaging applications, media player applications, social networking applications, calendar applications, and the like. In one embodiment, the application 107 may act as a client for the mapping platform 105 and perform one or more functions of the mapping platform 105 alone or in combination with the mapping platform 105. In yet another embodiment, the content providers 117, services 115, and/or services platform 114 receive the HOV/bi-modality events and/or related data generated by the mapping platform 105 for executing its functions and/or services.

The UE 103 may be configured with various sensors (not shown for illustrative convenience) for acquiring and/or generating probe data associated with a vehicle 101, a driver, other vehicles, conditions regarding the driving environment or roadway, etc. For example, sensors may be used as GPS receivers for interacting with one or more satellites 119 to determine and track the current speed, position and location of a vehicle travelling along a roadway. In addition, the sensors may gather tilt data (e.g., a degree of incline or decline of the vehicle during travel), motion data, light data, sound data, image data, weather data, temporal data and other data associated with the vehicle 101 and/or UEs 103. Still further, the sensors may detect local or transient network and/or wireless signals, such as those transmitted by nearby devices during navigation of a vehicle along a roadway (Li-Fi, near field communication (NFC)) etc. This may include, for example, network routers configured within a premise (e.g., home or business), another UE 103 or vehicle or a communicable traffic system (e.g., traffic lights, traffic cameras, traffic signals, digital signage).

It is noted therefore that the above described data may be transmitted via communication network 111 as probe data (e.g., GPS probe data) according to any known wireless communication protocols. For example, each UE 103, mobile application 107, user, and/or vehicle 101 may be assigned a unique probe identifier (probe ID) for use in reporting or transmitting said probe data collected by the vehicles 101 and UEs 103. In one embodiment, each vehicle 101 and/or UE 103 is configured to report probe data as probe points, which are individual data records collected at a point in time that records telemetry data. Probes or probe points can be collected by the system 100 from the UEs 103, applications 103, and/or vehicles 101 in real-time, in batches, continuously, or at any other frequency requested by the system 100 over, for instance, the communication network 111 for processing by the mapping platform 105.

In one embodiment, the mapping platform 105 retrieves aggregated probe points gathered and/or generated by UE 103 resulting from the travel of UEs 103, and vehicles 101 on a road segment. The probe database 109 stores a plurality of probe points and/or trajectories generated by different UEs 103, applications 107, vehicles 101, etc. over a period relative while traveling in a monitored area. A time sequence of probe points specifies a trajectory—i.e., a path traversed by a UE 103, application 107, vehicles 101, etc. over a period of time.

In one embodiment, the communication network 111 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 105 may be a platform with multiple interconnected components. The mapping platform 105 may include multiple servers, intelligent networking devices, computing devices, components and corresponding software for minding pedestrian and/or vehicle specific probe data from mix-mode probe data. In addition, it is noted that the mapping platform 105 may be a separate entity of the system 100, a part of the one or more services 115 of the services platform 114, or included within the UE 103 (e.g., as part of the applications 103).

In one embodiment, the content providers 117 may provide content or data (e.g., probe data) to the components of the system 100. The content provided may be any type of content, such as probe data, location data, textual content, audio content, video content, image content, etc. In one embodiment, the content providers 117 may also store content associated with the vehicles 101, the UE 103, the mapping platform 105, and/or the services 115. In another embodiment, the content providers 117 may manage access to a central repository of data, and offer a consistent, standard interface to data, such as a trajectories database, a repository of probe data, average travel times for one or more road links or travel routes (e.g., during free flow periods, day time periods, rush hour periods, nighttime periods, or a combination thereof), speed information for at least one vehicle, other traffic information, etc. Any known or still developing methods, techniques or processes for retrieving and/or accessing trajectory or probe data from one or more sources may be employed by the mapping platform 105.

By way of example, the UE 103, application 107, vehicles 101, and mapping platform 105 communicate with each other and other components of the system 100 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 15:
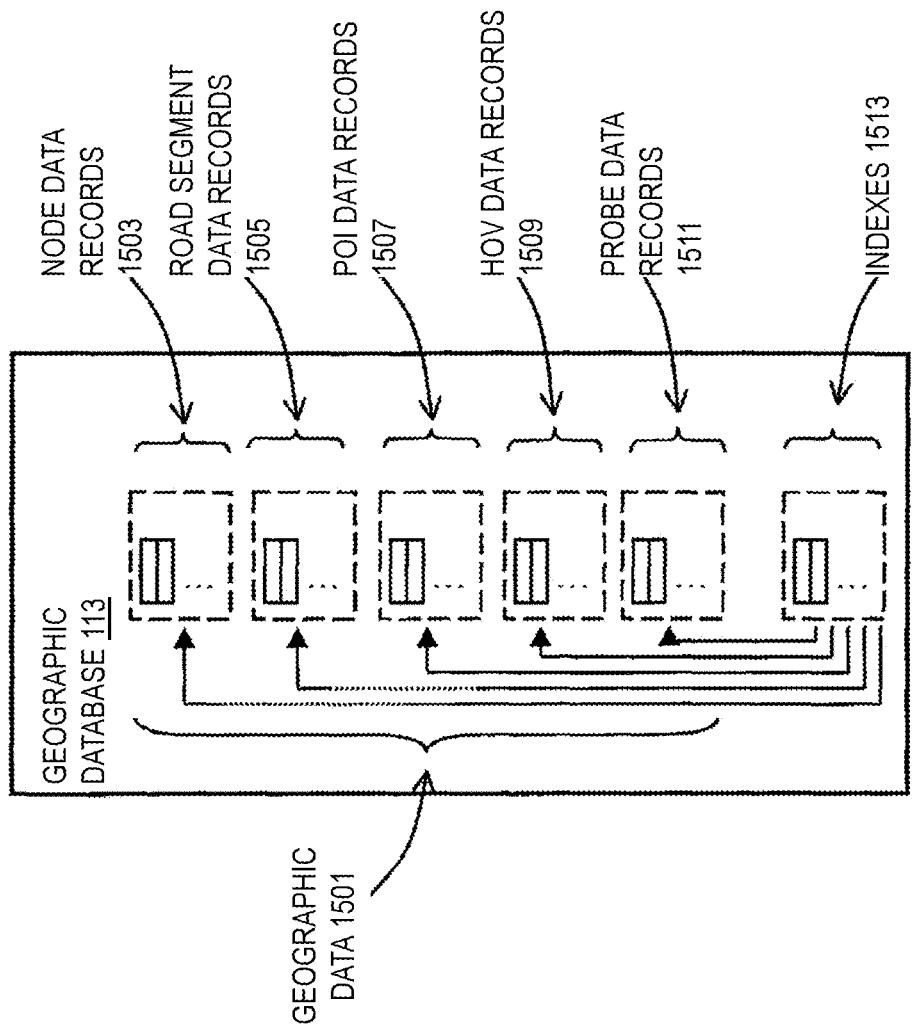
FIG. 15 is a diagram of geographic database, according to one embodiment.

FIG. 15 is a diagram of the geographic database 113 of system 100, according to exemplary embodiments. In the exemplary embodiments, modal routes, trajectories (sequences of probe points), road segments, lane model information and/or other related information can be stored, associated with, and/or linked to the geographic database 113 or data thereof. In one embodiment, the geographic database 113 includes geographic data 1501 used for (or configured to be compiled to be used for) mapping and/or navigation-related services, such as for personalized route determination, according to exemplary embodiments. For example, the geographic database 113 includes node data records 1503, road segment or link data records 1505, POI data records 1507, HOV data records 1509, and probe data records 1511, for example. More, fewer or different data records can be provided. In one embodiment, the other data records (not shown) can include cartographic ("carto") data records, routing data, and maneuver data. One or more portions, components, areas, layers, features, text, and/or symbols of the POI or event data can be stored in, linked to, and/or associated with one or more of these data records. For example, one or more portions of the trajectories or modal routes can be matched with respective map or geographic records via position or GPS data associations (such as using known or future map matching or geo-coding techniques), for example.

In exemplary embodiments, the road segment data records 1505 are links or segments representing roads, streets, or paths, as can be used in the calculated route or recorded route information for determination of one or more personalized routes, according to exemplary embodiments. The node data records 1503 are end points corresponding to the respective links or segments of the road segment data records 1505. The road link data records 1505 and the node data records 1503 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 1507. The geographic database 113 can also include data about places, such as cities, towns, or other communities, and other geographic features, such as bodies of water, mountain ranges, etc. Such place or feature data can be part of the POI data records 1507 or can be associated with POIs or POI data records 1507 (such as a data point used for displaying or representing a position of a city).

In addition, the geographic database 113 can include data about determined modal routes and their respective origin and destination locations in the HOV data records 1209. By way of example, detected HOV and/or bi-modality events for different time periods and contexts (e.g., real-time, season, day of the week, time of day, mode of transportation, etc.) can be determined and stored in the HOV data records 1209 for subsequent retrieval or access. In addition, trajectory and/or probe data processed, by the system 100 can be stored in the probe data records 1211. For example, lane distances, determined HS and LS clusters, reference lines, etc. can be stored in the trajectory data records 1211 for later retrieval or access.

The geographic database 113 can be maintained by the content provider 117 in association with the services platform 114 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database 113 or data in the master geographic database 113 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 113 can be a master geographic database, but in alternate embodiments, the geographic database 113 can represent a compiled navigation database that can be used in or with end user devices (e.g., vehicle 101, UE 103, etc.) to provide navigation-related functions. For example, the geographic database 113 can be used with the end user device to provide an end user with navigation features. In such a case, the geographic database 113 can be downloaded or stored on the end user device (e.g., vehicle 101, UE 103, etc.), such as in application 107, or the end user device can access the geographic database 113 through a wireless or wired connection (such as via a server and/or the communication network 111), for example.

The processes described herein for providing dynamic speed aggregation of probe data for HOV or equivalent lanes may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 16:
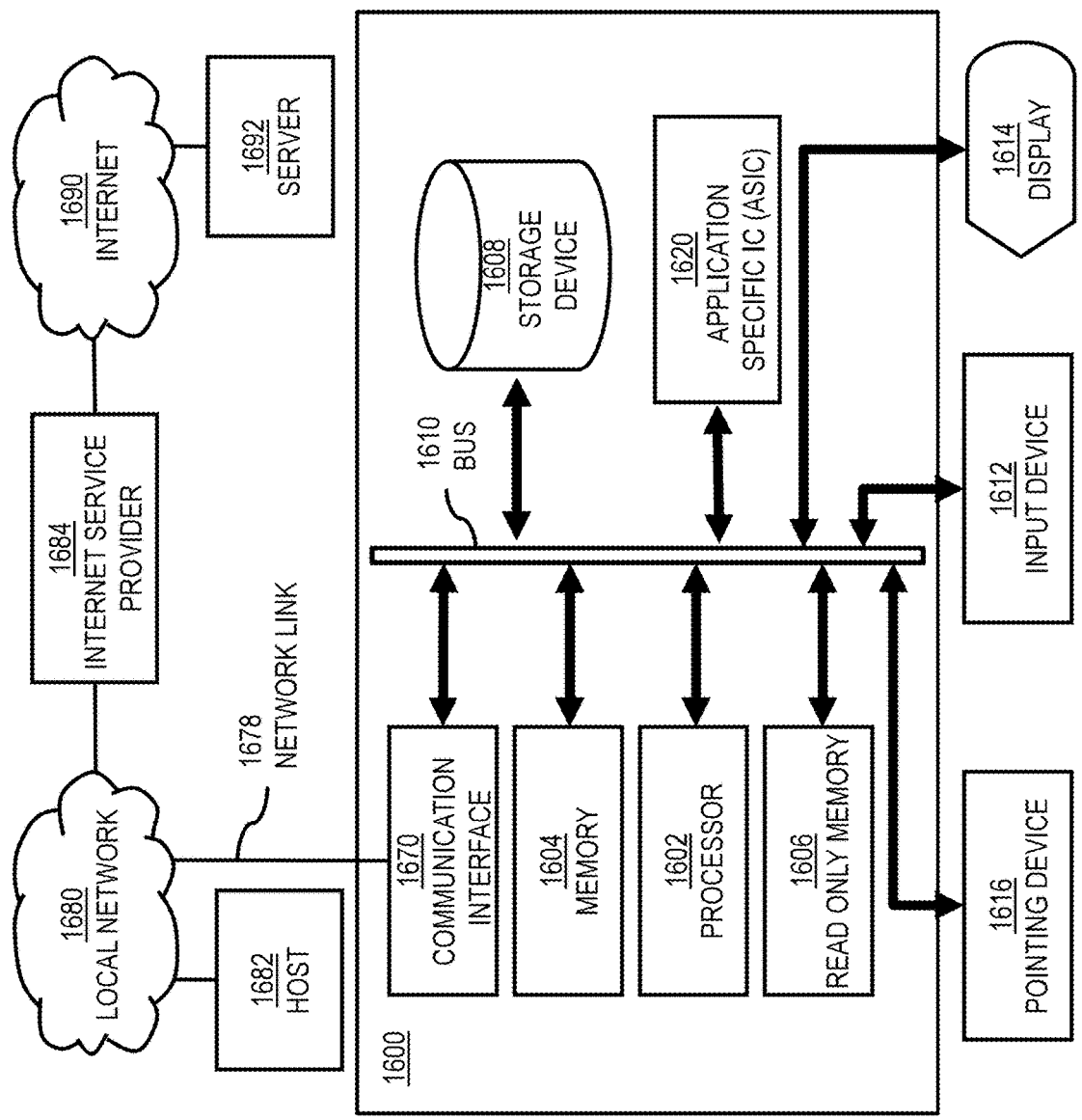
FIG. 16 is a diagram of hardware that can be used to implement an embodiment.

FIG. 16 illustrates a computer system 1600 upon which an embodiment of the invention may be implemented. Computer system 1600 is programmed (e.g., via computer program code or instructions) to provide dynamic speed aggregation of probe data for HOV or equivalent lanes as described herein and includes a communication mechanism such as a bus 1610 for passing information between other internal and external components of the computer system 1600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1610 includes one or more parallel conductors of information so that information is transferred quickly among devices coupled to the bus 1610. One or more processors 1602 for processing information are coupled with the bus 1610.

A processor 1602 performs a set of operations on information as specified by computer program code related to providing dynamic speed aggregation of probe data for HOV or equivalent lanes. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1610 and placing information on the bus 1610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1600 also includes a memory 1604 coupled to bus 1610. The memory 1604, such as a random access memory (RAM) or other dynamic storage device, stores information including processor instructions for providing dynamic speed aggregation of probe data for HOV or equivalent lanes. Dynamic memory allows information stored therein to be changed by the computer system 1600. RAM allows a unit of information stored at a location called a memory address to be stored and retrieved independently of information at neighboring addresses. The memory 1604 is also used by the processor 1602 to store temporary values during execution of processor instructions. The computer system 1600 also includes a read only memory (ROM) 1606 or other static storage device coupled to the bus 1610 for storing static information, including instructions, that is not changed by the computer system 1600. Some memory is composed of volatile storage that loses the information stored thereon when power is lost. Also coupled to bus 1610 is a non-volatile (persistent) storage device 1608, such as a magnetic disk, optical disk or flash card, for storing information, including instructions, that persists even when the computer system 1600 is turned off or otherwise loses power.

Information, including instructions for providing dynamic speed aggregation of probe data for HOV or equivalent lanes, is provided to the bus 1610 for use by the processor from an external input device 1612, such as a keyboard containing alphanumeric keys operated by a human user, or a sensor. A sensor detects conditions in its vicinity and transforms those detections into physical expression compatible with the measurable phenomenon used to represent information in computer system 1600. Other external devices coupled to bus 1610, used primarily for interacting with humans, include a display device 1614, such as a cathode ray tube (CRT) or a liquid crystal display (LCD), or plasma screen or printer for presenting text or images, and a pointing device 1616, such as a mouse or a trackball or cursor direction keys, or motion sensor, for controlling a position of a small cursor image presented on the display 1614 and issuing commands associated with graphical elements presented on the display 1614. In some embodiments, for example, in embodiments in which the computer system 1600 performs all functions automatically without human input, one or more of external input device 1612, display device 1614 and pointing device 1616 is omitted.

In the illustrated embodiment, special purpose hardware, such as an application specific integrated circuit (ASIC) 1620, is coupled to bus 1610. The special purpose hardware is configured to perform operations not performed by processor 1602 quickly enough for special purposes. Examples of application specific ICs include graphics accelerator cards for generating images for display 1614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1600 also includes one or more instances of a communications interface 1670 coupled to bus

1610. Communication interface 1670 provides a one-way or two-way communication coupling to a variety of external devices that operate with their own processors, such as printers, scanners and external disks. In general, the coupling is with a network link 1678 that is connected to a local network 1680 to which a variety of external devices with their own processors are connected. For example, communication interface 1670 may be a parallel port or a serial port or a universal serial bus (USB) port on a personal computer. In some embodiments, communications interface 1670 is an integrated services digital network (ISDN) card or a digital subscriber line (DSL) card or a telephone modem that provides an information communication connection to a corresponding type of telephone line. In some embodiments, a communication interface 1670 is a cable modem that converts signals on bus 1610 into signals for a communication connection over a coaxial cable or into optical signals for a communication connection over a fiber optic cable. As another example, communications interface 1670 may be a local area network (LAN) card to provide a data communication connection to a compatible LAN, such as Ethernet. Wireless links may also be implemented. For wireless links, the communications interface 1670 sends or receives or both sends and receives electrical, acoustic or electromagnetic signals, including infrared and optical signals, that carry information streams, such as digital data. For example, in wireless handheld devices, such as mobile telephones like cell phones, the communications interface 1670 includes a radio band electromagnetic transmitter and receiver called a radio transceiver. In certain embodiments, the communications interface 1670 enables connection to the communication network 111 for providing dynamic speed aggregation of probe data for HOV or equivalent lanes.

The term computer-readable medium is used herein to refer to any medium that participates in providing information to processor 1602, including instructions for execution. Such a medium may take many forms, including, but not limited to, non-volatile media, volatile media and transmission media. Non-volatile media include, for example, optical or magnetic disks, such as storage device 1608. Volatile media include, for example, dynamic memory 1604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 17 illustrates a chip set 1700 upon which an embodiment of the invention may be implemented. Chip set 1700 is programmed to provide dynamic speed aggregation of probe data for HOV or equivalent lanes as described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1700 includes a communication mechanism such as a bus 1701 for passing information among the components of the chip set 1700. A processor 1703 has connectivity to the bus 1701 to execute instructions and process information stored in, for example, a memory 1705. The processor 1703 may include one or more processing cores with each core configured to perform independently. A multi-core processor enables multiprocessing within a single physical package. Examples of a multi-core processor include two, four, eight, or greater numbers of processing cores. Alternatively or in addition, the processor 1703 may include one or more microprocessors configured in tandem via the bus 1701 to enable independent execution of instructions, pipelining, and multithreading. The processor 1703 may also be accompanied with one or more specialized components to perform certain processing functions and tasks such as one or more digital signal processors (DSP) 1707, or one or more application-specific integrated circuits (ASIC) 1709. A DSP 1707 typically is configured to process real-world signals (e.g., sound) in real time independently of the processor 1703. Similarly, an ASIC 1709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1703 and accompanying components have connectivity to the memory 1705 via the bus 1701. The memory 1705 includes both dynamic memory (e.g., RAM, magnetic disk, writable optical disk, etc.) and static memory (e.g., ROM, CD-ROM, etc.) for storing executable instructions that when executed perform the inventive steps described herein to provide dynamic speed aggregation of probe data for HOV or equivalent lanes. The memory 1705 also stores the data associated with or generated by the execution of the inventive steps.

Figure 18:
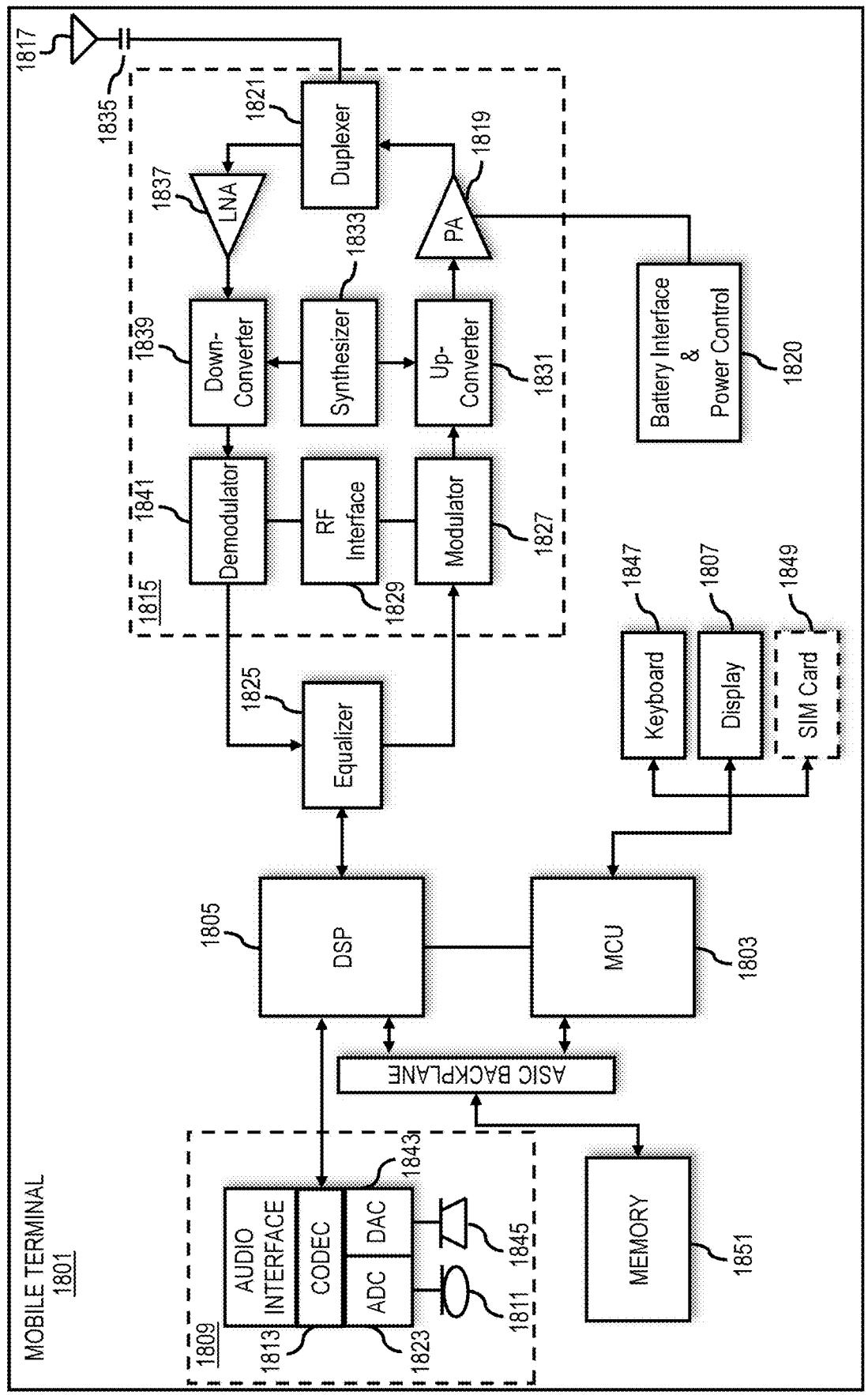
FIG. 18 is a diagram of a mobile terminal that can be used to implement an embodiment.

FIG. 18 is a diagram of exemplary components of a mobile terminal (e.g., UE 103) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1803, a Digital Signal Processor (DSP) 1805, and a receiver/transmitter unit including a microphone gain control unit and a speaker gain control unit. A main display unit 1807 provides a display to the user in support of various applications and mobile station functions that offer automatic contact matching. An audio function circuitry 1809 includes a microphone 1811 and microphone amplifier that amplifies the speech signal output from the microphone 1811. The amplified speech signal output from the microphone 1811 is fed to a coder/decoder (CODEC) 1813.

A radio section 1815 amplifies power and converts frequency in order to communicate with a base station, which is included in a mobile communication system, via antenna 1817. The power amplifier (PA) 1819 and the transmitter/modulation circuitry are operationally responsive to the MCU 1803, with an output from the PA 1819 coupled to the duplexer 1821 or circulator or antenna switch, as known in the art. The PA 1819 also couples to a battery interface and power control unit 1820.

In use, a user of mobile station 1801 speaks into the microphone 1811 and his or her voice along with any detected background noise is converted into an analog voltage. The analog voltage is then converted into a digital signal through the Analog to Digital Converter (ADC) 1823. The control unit 1803 routes the digital signal into the DSP 1805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1825 for compensation of any frequency-dependent impairments that occur during transmission though the air such as phase and amplitude distortion. After equalizing the bit stream, the modulator 1827 combines the signal with a RF signal generated in the RF interface 1829. The modulator 1827 generates a sine wave by way of frequency or phase modulation. In order to prepare the signal for transmission, an up-converter 1831 combines the sine wave output from the modulator 1827 with another sine wave generated by a synthesizer 1833 to achieve the desired frequency of transmission. The signal is then sent through a PA 1819 to increase the signal to an appropriate power level. In practical systems, the PA 1819 acts as a variable gain amplifier whose gain is controlled by the DSP 1805 from information received from a network base station. The signal is then filtered within the duplexer 1821 and optionally sent to an antenna coupler 1835 to match impedances to provide maximum power transfer. Finally, the signal is transmitted via antenna 1817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1801 are received via antenna 1817 and immediately amplified by a low noise amplifier (LNA) 1837. A down-converter 1839 lowers the carrier frequency while the demodulator 1841 strips away the RF leaving only a digital bit stream. The signal then goes through the equalizer 1825 and is processed by the DSP 1805. A Digital to Analog Converter (DAC) 1843 converts the signal and the resulting output is transmitted to the user through the speaker 1845, all under control of a Main Control Unit (MCU) 1803—which can be implemented as a Central Processing Unit (CPU) (not shown).

The MCU 1803 receives various signals including input signals from the keyboard 1847. The keyboard 1847 and/or the MCU 1803 in combination with other user input components (e.g., the microphone 1811) comprise a user interface circuitry for managing user input. The MCU 1803 runs a user interface software to facilitate user control of at least some functions of the mobile station 1801 to provide dynamic speed aggregation of probe data for HOV or equivalent lanes. The MCU 1803 also delivers a display command and a switch command to the display 1807 and to the speech output switching controller, respectively. Further, the MCU 1803 exchanges information with the DSP 1805 and can access an optionally incorporated SIM card 1849 and a memory 1851. In addition, the MCU 1803 executes various control functions required of the station. The DSP 1805 may, depending upon the implementation, perform any of a variety of conventional digital processing functions on the voice signals. Additionally, DSP 1805 determines the background noise level of the local environment from the signals detected by microphone 1811 and sets the gain of microphone 1811 to a level selected to compensate for the natural tendency of the user of the mobile station 1801.

The CODEC 1813 includes the ADC 1823 and DAC 1843. The memory 1851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1851 may be, but not limited to, a single memory, CD, DVD, ROM, RAM, EEPROM, optical storage, or any other non-volatile or non-transitory storage medium capable of storing digital data.

An optionally incorporated SIM card 1849 carries, for instance, important information, such as the cellular phone number, the carrier supplying service, subscription details, and security information. The SIM card 1849 serves primarily to identify the mobile station 1801 on a radio network. The card 1849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
  determining a line that is parallel to a road segment and divides the road segment along a longitudinal axis, wherein a first lane is a high-occupancy-vehicle (HOV) lane of a first side of the line along the road segment, and the second lane is a non-high-occupancy-vehicle (non-HOV) lane of a second side of the line along the road segment;
  determining a spatial distribution of probe data collected from the first lane of the first side and second lane of the second side of the road segment with respect to the line;
  clustering the probe data into a first cluster for the first lane and a second cluster for the second lane based on speed of a plurality of vehicles traveling in the first lane and the second lane;
  outputting a bi-modality event occurring on the first and second lanes of the road segment based on determining that a speed differential between the first cluster of the first lane and the second cluster of the second lane is above a threshold value; and
  determining a first distance of a first plurality of probes of the first cluster of the first lane from the line, and a second distance of a second plurality of probes of the second cluster of the second lane from the line, wherein the spatial distribution is based on the first distance and the second distance, and wherein the bi-modality event indicates that the HOV lane of the road segment can provide for faster travel than the non-HOV lane of the road segment.

2. The method of claim 1, the method further comprising:
publishing the bi-modality event as a high-occupancy-vehicle traffic event of the road segment.

3. The method of claim 2, wherein the road segment is selected based on a road topology indicating that the high-occupancy-vehicle traffic event can be published for the road segment.

4. The method of claim 1, further comprising:
classifying the first cluster, the second cluster, or a combination thereof as either a high-speed cluster or a low-speed cluster; and
rejecting the bi-modality event based on determining that a cluster of speed of the low-speed cluster is faster than a free-flow speed threshold.

5. The method of claim 1, further comprising:
classifying the first cluster, the second cluster, or a combination thereof as either a high-speed cluster or a low-speed cluster; and
rejecting the bi-modality event based on determining that the high-speed cluster is not a High Occupancy Vehicle (HOV) lane based on the spatial distribution.

6. The method of claim 2, further comprising:
creating a dynamic road segment to aggregate the roadway with one or more downstream road segments based on a distance threshold.

7. The method of claim 1, wherein the first distance, the second distance, or a combination is a closest perpendicular distance to the line.

8. The method of claim 1, wherein the first distance is a first mean or median distance of the first plurality of probes from the line, and the second distance is a second mean or median distance of the second plurality of probes from the line.

9. An apparatus comprising:
at least one processor; and
at least one memory including computer program code for one or more programs, the at least one memory and the computer program code configured to, with the at least one processor, cause the apparatus to perform at least the following,
determine a line that is parallel to a road segment and divides the road segment along a longitudinal axis, wherein a first lane is a high-occupancy-vehicle (HOV) lane of a first side of the line along the road segment, and the second lane is a non-high-occupancy-vehicle (non-HOV) lane of a second side of the line along the road segment;
determine a spatial distribution of probe data collected from the first lane of the first side and second lane of the second side of the road segment with respect to the line;
cluster the probe data into a first cluster for the first lane and a second cluster for the second lane based on speed of a plurality of vehicles traveling in the first lane and the second lane;
output a bi-modality event occurring on the first and second lanes of the road segment based on determining that a speed differential between the first cluster of the first lane and the second cluster of the second lane is above a threshold value; and
determine a first distance of a first plurality of probes of the first cluster of the first lane from the line, and a second distance of a second plurality of probes of the second cluster of the second lane from the line, wherein the spatial distribution is based on the first distance and the second distance, and wherein the bi-modality event indicates that the HOV lane of the road segment can provide for faster travel than the non-HOV lane of the road segment.

10. The apparatus of claim 9, wherein the apparatus is further caused to:
publish the bi-modality event as a high-occupancy-vehicle traffic event of the road segment.

11. The apparatus of claim 10, wherein the road segment is selected based on a road topology indicating that the high-occupancy-vehicle traffic event can be published for the road segment.

12. The apparatus of claim 10, wherein the apparatus is further caused to:
create a dynamic road segment to aggregate the roadway with one or more downstream road segments based on a distance threshold.

13. A non-transitory computer readable storage medium including one or more sequences of one or more instructions which, when executed by one or more processors, cause an apparatus to at least perform:
determining a line that is parallel to a road segment and divides the road segment along a longitudinal axis, wherein a first lane is a high-occupancy-vehicle (HOV) lane of a first side of the line along the road segment, and the second lane is a non-high-occupancy-vehicle (non-HOV) lane of a second side of the line along the road segment;
determining a spatial distribution of probe data collected from the first lane of the first side and second lane of the second side of the road segment with respect to the line;
clustering the probe data into a first cluster for the first lane and a second cluster for the second lane based on speed of a plurality of vehicles traveling in the first lane and the second lane;
outputting a bi-modality event occurring on the first and second lanes of the road segment based on determining that a speed differential between the first cluster of the first lane and the second cluster of the second lane is above a threshold value; and
determining a first distance of a first plurality of probes of the first cluster of the first lane from the line, and a second distance of a second plurality of probes of the second cluster of the second lane from the line,
wherein the spatial distribution is based on the first distance and the second distance, and
wherein the bi-modality event indicates that the HOV lane of the road segment can provide for faster travel than the non-HOV lane of the road segment.

14. The non-transitory computer readable storage medium of claim 13, wherein the apparatus is caused to further perform:
publishing the bi-modality event as a high-occupancy-vehicle traffic event of the road segment.

15. The non-transitory computer readable storage medium of claim 14, wherein the road segment is selected based on a road topology indicating that the high-occupancy-vehicle traffic event can be published for the road segment.

16. The non-transitory computer readable storage medium of claim 14, wherein the apparatus is caused to further perform:

creating a dynamic road segment to aggregate the roadway with one or more downstream road segments based on a distance threshold.

* * * * *